United States Patent [19]

Burnard et al.

[11] Patent Number: 5,613,122
[45] Date of Patent: Mar. 18, 1997

[54] OBJECT-ORIENTED OPERATING SYSTEM

[75] Inventors: David J. Burnard; Thomas H. Taylor, both of San Jose, Calif.

[73] Assignee: Object Technology Licensing Corp., Cupertino, Calif.

[21] Appl. No.: 339,101

[22] Filed: Nov. 14, 1994

[51] Int. Cl.⁶ .................................................. G06F 9/44
[52] U.S. Cl. ............................... 395/701; 395/155
[58] Field of Search .................................. 395/155, 700

[56] References Cited

U.S. PATENT DOCUMENTS

| | | | |
|---|---|---|---|
| 4,495,491 | 1/1985 | Postl . | |
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 395/425 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,204,945 | 4/1993 | Sakaibara et al. . | |
| 5,243,519 | 9/1993 | Andrews et al. | 364/419.05 |
| 5,265,202 | 11/1993 | Krueger et al. . | |
| 5,309,555 | 5/1994 | Akins et al. . | |
| 5,313,636 | 5/1994 | Noble et al. | 395/700 |
| 5,315,703 | 5/1994 | Matheny et al. | 395/164 |
| 5,315,709 | 5/1994 | Alston, Jr. et al. | 395/600 |
| 5,317,741 | 5/1994 | Schwanke | 395/700 |
| 5,321,841 | 6/1994 | East et al. | 395/725 |
| 5,325,481 | 6/1994 | Hunt | 395/159 |
| 5,325,522 | 6/1994 | Vaughn | 395/600 |
| 5,325,524 | 6/1994 | Black | 395/600 |
| 5,325,533 | 6/1994 | McInerney et al. | 395/700 |
| 5,339,390 | 8/1994 | Robertson . | |
| 5,551,055 | 8/1996 | Matheny et al. | 395/882 |

*Primary Examiner*—Kevin A. Kriess
*Assistant Examiner*—Dennis M. Butler
*Attorney, Agent, or Firm*—Bookstein & Kudirka

[57] ABSTRACT

User interface objects are stored in a user interface object archive which is a database physically located in the shared library of an associated application program. In order to facilitate "localization", or preparation of an application developed in one language for use in an "area" or a locale which uses another language, the user interface objects are stored in a hierarchical locale tree within the archive. All objects are stored in the base or root of the hierarchy, but only those objects which require a translation are stored in an area associated with a more specific locale. At runtime, a complete collection of objects is assembled by starting at the desired locale and proceeding up the hierarchy level-by-level. Translated objects at lower levels of the hierarchy "override" those at higher levels so that the most complete translations of each object are obtained during this search. The user interface objects which are stored in an archive are actually created via a predefined "constructor" program, and, in order to allow newly-created user interface objects to use the predesigned constructor program, each user interface object is contained in a special "escort" object that interfaces with the constructor program. Both the user interface object and the escort object are stored at the appropriate locale in the archive, but when an archived object is requested, the related escort object is queried and streams out the attributes of the enclosed UI object. The escort object itself remains in the archive.

22 Claims, 36 Drawing Sheets

ROOT

OBJECT 1
OBJECT 2
OBJECT 3
OBJECT 4
OBJECT 5

ENGLISH

OBJECT 4
OBJECT 5

USA

OBJECT 4

PACIFIC TIME ZONE

OBJECT 1
OBJECT 4
OBJECT 5

EASTERN TIME ZONE

ENGLAND

AUSTRIALIA

FRENCH

OBJECT-ORIENTED OPERATING SYSTEM

Portions of this patent application contain materials that are subject to copyright protection. The copyright owner has no objection to the facsimile reproduction by anyone of the patent document, or the patent disclosure, as it appears in the Patent and Trademark Office. All other rights are expressly reserved.

FIELD OF THE INVENTION

This invention relates generally to improvements in computer systems and, more particularly, to operating system software for managing user interface objects in a windows-oriented graphical user interface.

BACKGROUND OF THE INVENTION

One of the most important aspects of a modern computing system is the interface between the human user and the machine. The earliest and most popular type of interface was text based; a user communicated with the machine by typing text characters on a keyboard and the machine communicated with the user by displaying text characters on a display screen. More recently, graphic user interfaces have become popular in which the machine communicates with the user by displaying graphics, including text and pictures, on a display screen and the user communicates with the machine both by typing in text-based commands and by manipulating the displayed pictures with the pointing device, such as a mouse.

Many modern computer systems operate with a graphic user interface called a "window environment" in which the main user interface object is the "window". In a typical window environment, the graphical display portrayed by the display screen is arranged to resemble the surface of an electronic "desktop" and each application program running on the computer is represented as one or more electronic "paper sheets" displayed in rectangular regions of the screen called "windows".

Each rectangular region generally displays information which is generated by the associated application program and there may be several window regions simultaneously present on the desktop with each window region representing information generated by different application programs. An application program presents information to the user through each window by drawing or "painting" images, graphics or text within the window region. The user, in turn, communicates with the application both by "pointing" at objects in the window region with a cursor which is controlled by a pointing device and manipulating or moving the objects and also by typing information into the keyboard. The window regions may also be moved around on the display screen and changed in size and appearance so that the user can arrange the desktop in a convenient manner.

There may be several types of windows associated with each application program—these windows include the main window, which is always present, and other windows such as "pop-up" windows which appear in response to a specific user or program action. Pop-up windows include a type of window called a "dialog" box which is a type of pop-up window that appears on the screen for a short duration of time and accomplishes a specific task, such as obtaining a file name or performing a selection. Simple applications may include only the main window, while complicated applications may use tens and ever hundreds of pop-up windows and dialog boxes. There are also windows, called palettes and panels that are always on the screen and utilized in conjunction with the main window. They typically float above the main window facilitating easy access to commands, colors or direct manipulation elements.

The windows, in turn, include other user interface objects such as, scroll bars which can be used to move or change the portion of the window which is displayed and menu systems that allow a user to select various commands and actions. In addition, window environments also typically provide "standard" user interface objects called "controls" which can be displayed in the windows and manipulated by the user. The standard objects allow all of the application programs which run with a given GUI to have the same "look and feel" and, thus, user learning time is generally reduced.

The standard objects can include push buttons which are generally rectangular areas of the window which are rendered to appear as a "three-dimensional" button. The push-button has built-in behavior which is controlled by the window system to change the screen appearance of the button so that the button appears to be "pushed in" when the button display area is selected. Other selection displays include "checkboxes" which can display a check mark or other indicia to indicate a selection and "radio buttons" which are a set of check boxes in which selection of one box deselects the other boxes in the set.

Other standard user interface objects include objects which display items. These displays include text display areas and graphics display areas. The text display areas may include a simple line of text which displays text but cannot be edited. More complicated displays include list boxes which display a scrollable list of either graphical or text items and drop-down list boxes which appear as a single line but expand to a list when a predefined area is selected. With list boxes and drop-down lists the user may be able to select items as well as manipulate the displays. Still more complicated display areas include edit areas which are rectangular areas that allow the user to edit text using predefined commands. Some window environments allow the users to design their own controls which may be combinations of existing controls or entirely new controls with custom behaviors.

The graphic display areas can include user-designed bit map graphics, icons and customer user graphics.

In most windows systems, the overall behavior and appearance of the aforementioned windows and controls are determined by the portion of the operating system known as a "graphical user interface" (GUI) or the "graphical device interface" (GDI). Instead of an application program drawing and controlling the user interface, object, the GUI system actually renders the interface object on the display screen and controls appearance changes due to user selection movement and manipulation. User manipulations of the object are communicated to the application program by messages that are sent from the GUI to the application program and the application program controls the interface objects by sending messages to the GUI.

Even though an application program does not actually control drawing of the interface objects, the application program must initially specify parameters such as the size, position and appearance attributes (such as colors) for each user interface object to the GUI so that the object can be initially rendered in the desired position with the proper appearance. In many windows environments, the user interface object parameters are stored in a "resource" file in which each user interface object is assigned an identifier and associated with a list of parameters for that object. During the normal application program development cycle, after the application program is written and compiled, the resource file is also compiled and the resource object file is "bound" to the object file of the application program. Thereafter, during the operation of the application program, a user interface object is drawn on the screen by making a function call to the GUI and including the resource file identifier as a parameter in the function call. The GUI then reads the resource file and extracts the necessary parameters to render the interface object.

The structure and format of the resource file are fixed by the GUI and it is possible for an application program developer to directly compose and edit the resource file. However, direct composition and editing of the file is extremely tedious since each interface object generally has many separate parameters, all of which must be included to properly render the object. In addition it is often very difficult to position the objects with respect to each other and compose and entire screen display simply by looking at the parameter lists for each object.

Accordingly, user interface objects are generally designed by means of a "resource editor" program. This latter program uses the contents of a resource file to generate displays of the user interface objects contained therein which displays appear on the display screen in the same manner as they would appear when drawn by the GUI as the application program is actually being run. The application program developer can manipulate the object displays and, in response, the resource editor program edits the resource file parameters to insure that the user interface objects will appear properly when drawn by the GUI.

While the resource editor approach works well with small to medium size projects, for large projects it becomes a bottleneck. A large development project may have hundreds, or even thousands, of user interface objects. In addition, many programmers may simultaneously be working on parts of a project or several different projects which, although separate, share user interface objects. If a single resource file is used for the entire project, then the normal development cycle of compile, link, test and debug results in the resource file being compiled over and over or worse, results in developers having to wait for the file to be free. If several smaller resource files are used, then some method must be used to insure that duplicated interface objects are kept up to date and that everyone is using the latest versions.

Further, the resource file/editor approach is not flexible. In particular, the resource editor is designed to work with a predefined set of user interface objects. If a new user interface object is designed, then the resource editor must be rewritten to accommodate this new object. Consequently, the conventional resource editor approach is a poor choice in flexible development environments such as object-oriented development environments which are designed to be easily extensible.

In addition, the traditional resource file/editor approach is not easily adaptable to multi-lingual environments where the text appearing in the user interface must be translated into a local language to allow the program to work in foreign countries. The normal manner of handling this problem is to consolidate all text strings in a separate "string table". Rather than coding a text string directly into program code, the corresponding text is inserted as an entry in the string table along with an identifier. The application program code uses the identifier to retrieve the appropriate string at runtime from the string table and the string is then displayed. Since most of the text is located in a single table, the task of translating the text into a local language is greatly simplified.

The string table approach suffers from the same problems as the resource file. First, a single string table becomes a bottleneck during the normal development cycles. Second, multiple string tables must be coordinated to avoid different text strings from being associated with the same interface object. In addition, although conventional string tables contain most of the text information for a development project, a significant amount of text still becomes embedded directly into the program. This latter text includes menu headings and menu option lines, text found on button faces, and miscellaneous text displays. Accordingly, the job of translating an application program into a new language still remains a tedious and time-consuming job. This remains true even if the text portions of some of the user interface objects have already been translated, since the remainder of the text must still be found and translated.

Accordingly, it is an object of the present invention to provide a user interface object archiving system which can manage user objects to insure consistency between various sections of a project or various projects which utilize common objects.

It is another object of the present invention to provide a user interface object archiving system which can easily accommodate newly-designed user interface objects without requiring a rewrite of the object editor.

It is still a further object of the present invention to provide a user interface archiving system which facilitates the translation of the text in an application to an alternative language.

SUMMARY OF THE INVENTION

The foregoing problems are overcome and the foregoing objects are achieved in one illustrative embodiment of the invention in which user interface objects are stored in a user interface object archive which is a database physically located in the shared library of an associated application program. In order to facilitate "localization", or preparation of an application developed in one language for use in an "area" or a locale which uses another language, the user interface objects are stored in a hierarchical locale tree within the archive. As the tree proceeds away from the root locale the locales become more-and-more specific as to language. All objects are stored in the base or root of the hierarchy, but only those objects which require a translation are stored in an area associated with a more specific locale. At runtime, a complete collection of objects is assembled by starting at the desired locale and proceeding up the hierarchy level-by-level. Translated objects at lower levels of the hierarchy "override" those at higher levels so that the most complete translations of each object are obtained during this search.

The user interface objects which are stored in an archive are actually created via a separate "constructor" program which is used by application developers to edit standard user interface objects and to create new user interface object. In order to allow newly-created user interface objects to use the predesigned constructor program, each user interface object is contained in a special "escort" object that actually interfaces with the constructor program. The user interface object is stored at the appropriate locale in the archive, while the escort object is not saved. However, when an archived object is requested, the related escort object is queried and streams out the attributes of the enclosed UI object. The escort object itself remains in the archive. Therefore, functions and variable instances which are necessarily included in the escort object which allow it to interact with the constructor program do not end up in the application program.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT OF THE INVENTION

Figure 1:
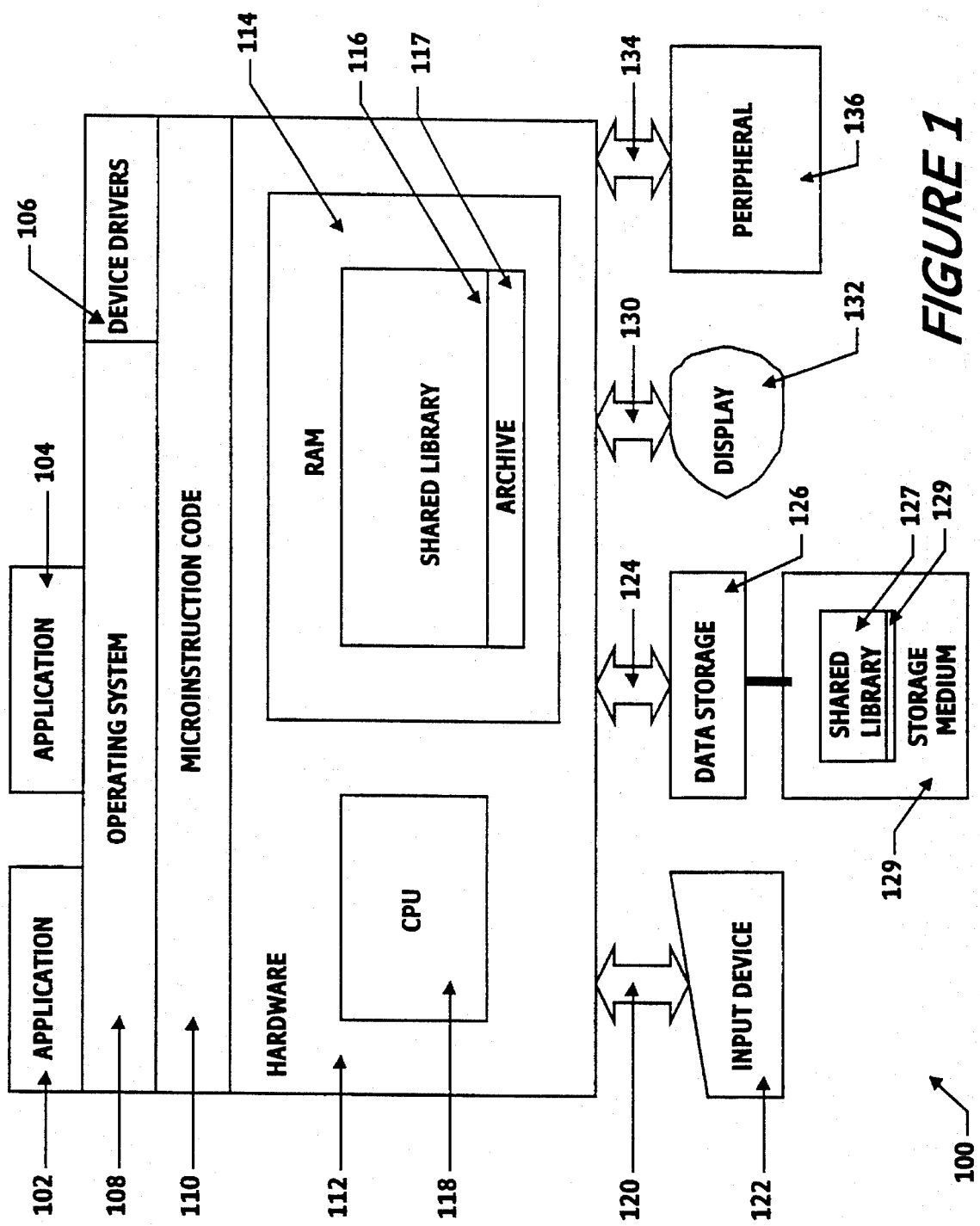
FIG. 1 is a schematic block diagram of a prior art computer system showing the relationship of the application program to the operating system and the display drivers and the location of the shared libraries.

The invention is preferably practiced in the context of an operating system resident on a personal computer such as the IBM PS/2 or Apple Macintosh computer. A representative hardware environment is depicted in FIG. 1, which illustrates, in a highly schematic fashion, a typical hardware configuration of a computer system 100 on which constructor program and the user interface object archives (not shown) of the present invention reside. Computer system 100 is comprised of hardware components 112 which include random access memory 114 and central processing unit (CPU) 118. It should be noted that, although central processing unit 118 is shown as a single block representing a single processor, it may actually comprise multiple processors operating in parallel.

Computer system 100 also includes a number of input/output and peripheral devices illustrated along the bottom of the figure. These devices include a representative input device 122 which may comprise a keyboard, mouse, trackball, lightpen or other conventional input device. Device 122 is coupled for bi-directional information transmission to hardware components 112 as illustrated schematically by arrow 120. A data storage device 126 is also shown coupled to hardware components 112, via arrow 124. Data storage device 126 may comprise a conventional hard disk or a removable-media disk (such as a floppy disk.) Such a drive typically operates with a removable or a non-removable medium schematically represented by box 129.

Shared libraries 128 and their associated shared library archive 127 are stored on medium 129 in which the constructor program and the user interface archives of the present invention are stored. During the normal operation of computer system 100, the shared libraries 128 located on the storage medium 129 are transferred, via data storage device 126, (as indicated schematically by arrow 124) to RAM 114 as illustrated schematically as shared libraries 116.

A display device 132 is generally provided which may be a CRT monitor, an LCD flat panel, an electroluminescent or other visual display which is capable of displaying graphical information. Display 132 is also coupled to hardware components 112 as illustrated schematically be arrow 130. Computer system 100 may also include additional peripherals, such as printers, which are schematically illustrated by box 136. These peripherals are also coupled to hardware components 112 as indicated by arrow 134.

Computer system 100 also includes an operating system 108 and a plurality of device drivers 106. The operating system 108 and the device drivers 106 interface with the hardware components 112 by means of well-known microinstruction code 110 in a conventional manner. Device drivers 106 may also interact directly with the operating system 108.

Application programs are shown schematically as boxes 102 and 104. Although only two application programs are shown, obviously more programs may be running simultaneously. Programs 102 and 104 may interact directly with the operating system 108 but may alternatively interact directly with the device drivers 106. By means of operating system 108 and microinstruction code 110, programs 102 and 104 coordinate and control the operation of the hardware components 112 and the peripheral devices.

Operating system 108 represents a substantially full-function operating system such as the aforementioned Apple System/7' operating system. Operating system 108 includes a graphical user interface (GUI) which operates in a windowing environment. As such, a user running application programs 102 or 104 will interact with each program by manipulating a set of graphical displays which are generally rendered on the display 132 by a corresponding set of user interface (UI) objects as will hereinafter be described in detail.

In accordance with the principles of the invention, application programs 102 and 104 obtain the UI objects which generate the program displays from the shared library 116 by accessing a UI object archive located therein. The UI objects are designed by a program developer with the use of a special "constructor" program during program development of the application programs 102 and 104 and stored in the archives. At runtime, the UI object information is retrieved from the archives and transferred from the shared libraries 116, with its associated shared library archive 117, into the application programs 102 and 104 in order to generate graphics on display 132.

In a preferred embodiment, the invention is implemented in a C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or member functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined GUI objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace). These application frameworks include a set of standard objects which create windows, scroll bars, menus, etc., each with its own pre-defined behavior. Generally each of the objects is associated with a screen display which the object can render in response to a call of one of its member functions.

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a display framework which could provide the foundation for creating and manipulating windows and UI objects displayed within the windows to display information generated by an application program. An application software developer who needed these capabilities would ordinarily have to write specific routines to provide them. To do this with a framework, the developer only needs to supply the characteristics and behavior of the finished display, while the framework provides the actual routines which perform the tasks. In addition, the framework supplies a set of pre-defined objects and a mechanism to modify these objects and create new ones.

A preferred embodiment takes the concept of frameworks and applies it throughout the entire software system, including the application programs and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 2:
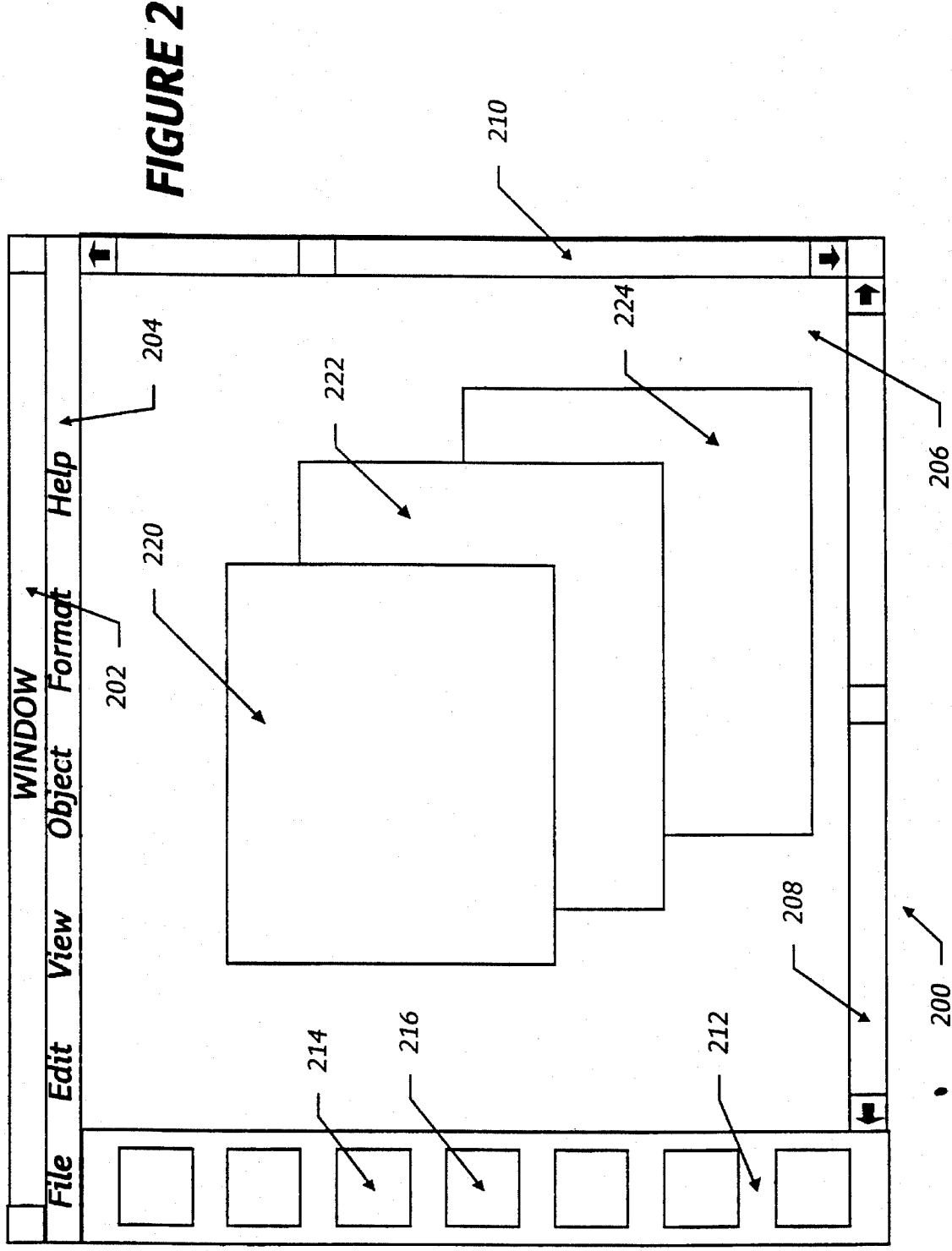
FIG. 2 is a schematic diagram of a conventional screen display generated by user interface objects in a windowing environment.

FIG. 2 shows an illustrative screen display generated by a typical application program which uses a GUI that, in turn, uses user interface (UI) objects. When such a program is used in a windowing environment, the application main area is generated by one of the UI objects. The enclosed rectangular area is defined by borders and is called a "window" or "view" 200. This window is normally called the "main" or "pop-up" window because it initially appears when the application begins to run, and, in accordance with normal windowing operation, the main window can be moved and resized in a conventional manner. The window usually includes a title bar 202 and a menu bar 204. The menu bar allows access to a number of pull-down menu palettes that are operated in a well-known manner and allow the user to operate various file, editing and other commands.

Within the main window, the area remaining after excluding the title bar, the menu bar and the borders is called the "client" area and constitutes the area that can be modified by an application program, such as a drawing program. A client area may enclose additional windows called "child" windows that are associated with the main window. In this case the main window is called a "parent" window in relation to the child windows. Each child window may also have one or more child windows associated with it for which it is a parent window and so on.

Most application programs further sub-divide the client area into a number of child windows. These typically include a document window 206, a "toolbar" or "palette" window 212, and, in some cases, a control window 218. The document window 206 which may be equipped with horizontal and vertical scroll bars, 208 and 210, that allow objects in the document window to be moved on the screen. As used herein, the term "document" means a file which may contain text, graphics or both. The document window 206 may be further sub-divided into child windows which, in accordance with normal windowing operation, may overlap each other. At any given time usually only one of the child windows is active or has input "focus". Only the window which has input focus responds to input actions and commands. Such windows are schematically shown as child windows 220, 222 and 224.

The toolbar/palette window usually contains a number of iconic images, such as icons 214 and 216, which are used as a convenient way to initiate certain, often-used routines. For example, icon 214 may be selected to initiate a drawing routine which draws a box on the screen, whereas icon 216 might represent a drawing routine that draws a circle on the screen. The operation of such toolbars and palettes is generally well-known and will not be described further herein.

Some main windows also contain a control window 218, which may contain additional menus, push buttons, checkboxes, radio buttons or other control elements that allow further routines to be run. Such controls are generally selected by means of a mouse or other input device. In any case, each of the element graphical displays generated on the screen is created by a corresponding user interface object. The mechanism used to create the screen display by the user interface object depends on the operating system. In some GUI operating systems, the screen displays are controlled by a screen or window manager and the control displays are created by the user interface objects by calling an appropriate screen manager function. Other operating systems allow objects to draw their own screen displays (in an area specified by the screen manager). In this latter case the screen display is drawn by calling a member function of the associated user interface object.

In accordance with the principles of the present invention, the UI objects which generate the screen displays can be created in advance by the use of a special "constructor" program. The constructor program is itself object-oriented and extensible so that it can create and edit both existing UI objects and UI objects created by a program developer. UI objects created or edited with the constructor program are stored in an archive file and can be retrieved at runtime to generate the appropriate screen displays.

The Archive File

The archive file which stores the UI objects is associated with a shared library and hidden from users in the shared library's file group. Objects are retrieved from the archive by "name" and the name of an object stored in an archive can be any text string. Accordingly, the object names of objects which will be used by an application program are coded into the program during program development. Since the names are compiled into the application program code that accesses the archived objects, the archived objects are treated as "static" data and are bundled into the shared library associated with the application program code.

Each UI object archive has a client interface. This allows the archive and the UI objects in the archive to be shared by several program developers or development teams. The client interface prevents one development team from changing an object in an archive, thereby leaving all of the other teams (using the same archived object) in an inconsistent state. In addition, normally, most UI objects are not accessed directly from an archive by an application program, but instead, are accessed through a high-level application programming interface. For example, an application program which interacts with a scanner would never request the scanner's configuration dialog box from the associated archive. Instead, the program would access the scanner configuration dialog box through a method in a scanner object associated with the scanner.

Archive Locale Trees

In order to facilitate "localization", or preparation of an application developed in one language for use in an "area" or a locale which uses another language, and in accordance with the principles of the present invention, the UI objects are stored in a special framework within the archive. Normally, localization of an application would require a translation of text strings embedded within the object. However, not all objects include text strings and, thus, not all objects need to be translated. Nevertheless, in prior art systems it is common to include a complete set of UI objects for each localized program, resulting, in some cases, in many duplicated objects residing in storage. According to one aspect of the present invention, only those objects which require a translation are stored in an area associated with a particular locale and objects which do not need a translation are stored in a different locale. At runtime the complete collection of objects is assembled to form the program display.

Figure 3A:
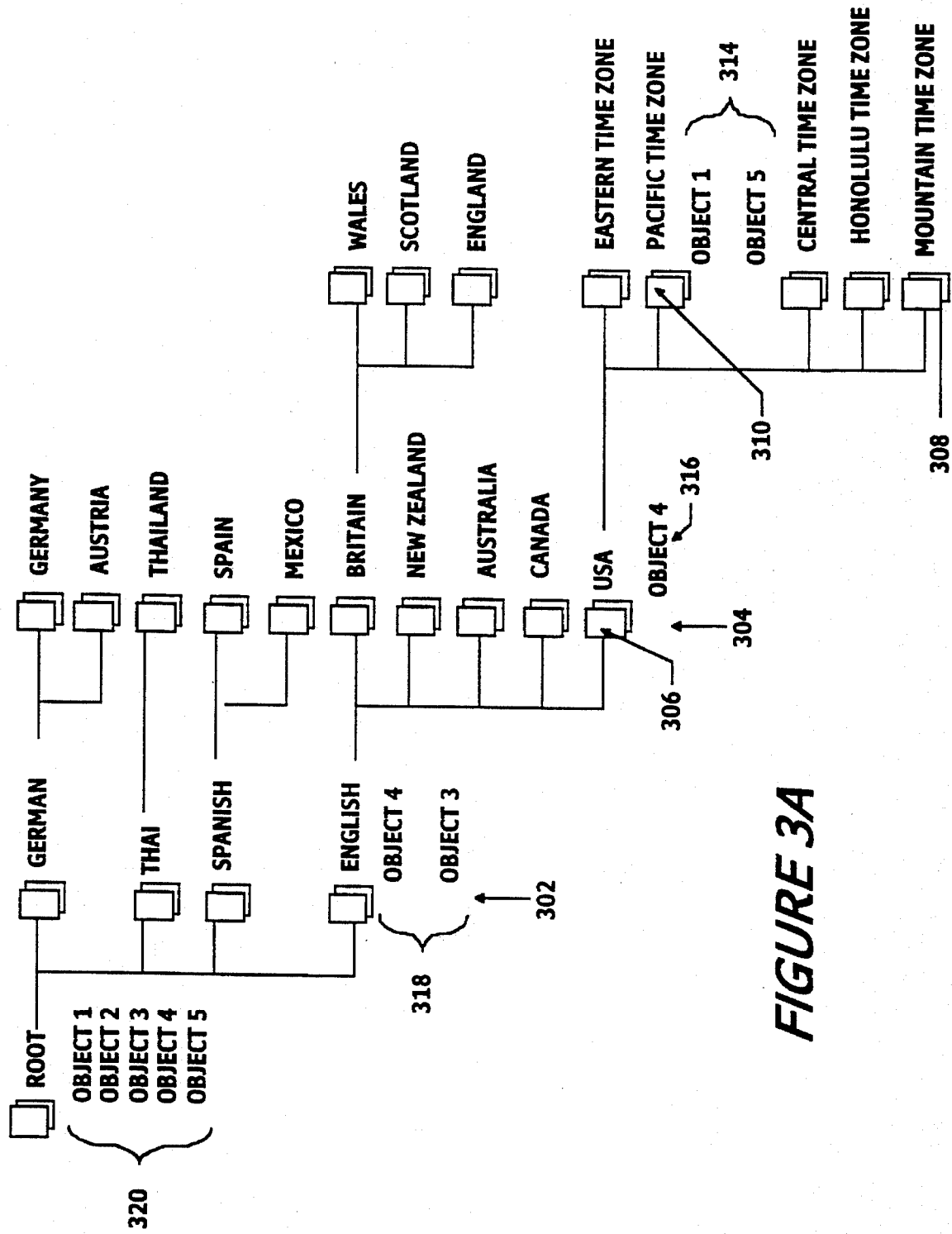
FIG. 3A is a schematic diagram of a locale tree illustrating the manner in which user interface objects are stored in an archive.

More particularly, the UI objects are stored in a "locales" hierarchy. An illustrative hierarchy is illustrated in FIG. 3A and provides specialized locales for language, dialect, country, and region. Although one particular hierarchical organization is shown in FIG. 3A, other organizations will be apparent within the scope of the present invention. At the start of the illustrated hierarchy is a locale 300 called "Root." The "Root" locale 300 contains a complete set of archived objects 320 (illustratively designated as Object 1–Object 5) and is the place where a programmer initially stores a set of objects created during program creation. The embedded strings in these root objects 320 may be in any language—French or Spanish, or English, or whatever—depending on where the application program that created and used the objects was initially developed.

The next level of the illustrative hierarchy might be language locales 302. The language locales 302 only contain objects that need to be localized for that particular language. For example, the only objects stored in the "English" locale would be copies of objects in the root locale 300 which contain text that had to be translated into English, which might occur, for example, if the corresponding object in the root locale 300 contained embedded text that was not in English. The objects in the English locale would then be the same as the objects in the root locale with the exception that embedded text would be translated into English. The locale hierarchy is arranged so that objects in each locale level down the hierarchy from the root locale 300 which need to be changed for that locale "override" the corresponding objects in a higher level.

The "overriding" operation means that whatever locale is chosen in the hierarchy, there is a complete set of archived objects visible to the user, but some of the objects are stored in the chosen locale while others (which do not require translation) are stored at higher levels of the locale hierarchy. The overriding operation also means that new objects (such as a new dialog or string) can only be created in the root locale. At any other locale, objects can be created only if they're "overriding" objects (an object of the same name and class must first exist in a higher locale level or the root locale).

Objects with the same name may exist in one or more locales, but one locale is designated as the "current" locale. Normally, when a program requests an object from an archive, the archive will return a copy of the object for the current system locale, but a program may also request an object from a specified locale. When such a request is made, the archive will search for the object in the specified locale first (if a locale is not specified, then the current locale will be searched), and if a copy of the object with the proper text translation is not found, then the archive will search in the next higher level and so on, up the hierarchy until an object with the closest translation is found or the root locale is searched. For example, an object with embedded English text might be sought and found, but the English text might not be in the dialect which is sought). The root locale 300 exists so that each sub-locale doesn't have to have a complete and duplicate set of every object used by the program.

Referring to FIG. 3A, the illustrative locale hierarchy begins at the root locale 300 and includes a "language" level 302, a "country" level 304 and a "regional" level 308. Assume that a application program which requires five user interface objects (Object 1–Object 5) was originally written in Chinese. In accordance with the operation described above, the five objects are stored in the archive in the root locale 300 with embedded text in Chinese. However, of these five objects, only object 4 and object 5 actually include embedded text, the remainder of the objects contain generic graphics. Next, assume that the application must be translated for use in the Pacific Time Zone 310 of the regional level 308 and requests the five objects from the Pacific Time Zone 310. The archive examines the locale 310 and determines that Objects 1 and 5 are present in the locale having been translated for the Pacific Time Zone. The archive then moves to the next higher level (the country level 304) looking for Objects 2, 3 and 4 which were not found in the Pacific Time Zone locale 310.

The Pacific Time Zone locale 310 is a lower level of the USA country locale 306. In this latter locale, a translated version of Object 4 is located and added to the collection of objects retrieved by the archive. Since Objects 2 and 3 still have not been found, the next locale level is examined (the language level 302). In the English locale (from which the USA locale descends) Objects 4 and 5 are located. However, since Object 4 has been found at a lower level (USA locale), the lower level version overrides the object version found at the English locale level. Finally, the remaining Object 2 is retrieved from the root locale (this object is generic and needs no translation). Thus, a complete set of objects is retrieved for each application program which is localized, but object duplication is greatly reduced.

The locale tree structure used in an archive can be a conventional tree structure of the type found in many existing application frameworks. There are three different mechanisms for storing objects in a tree structure: 1) escorts stored in the Constructor document, 2) objects stored in the archive viewer tree, and 3) actual objects stored in the archive file on disk.

Figure 3B:
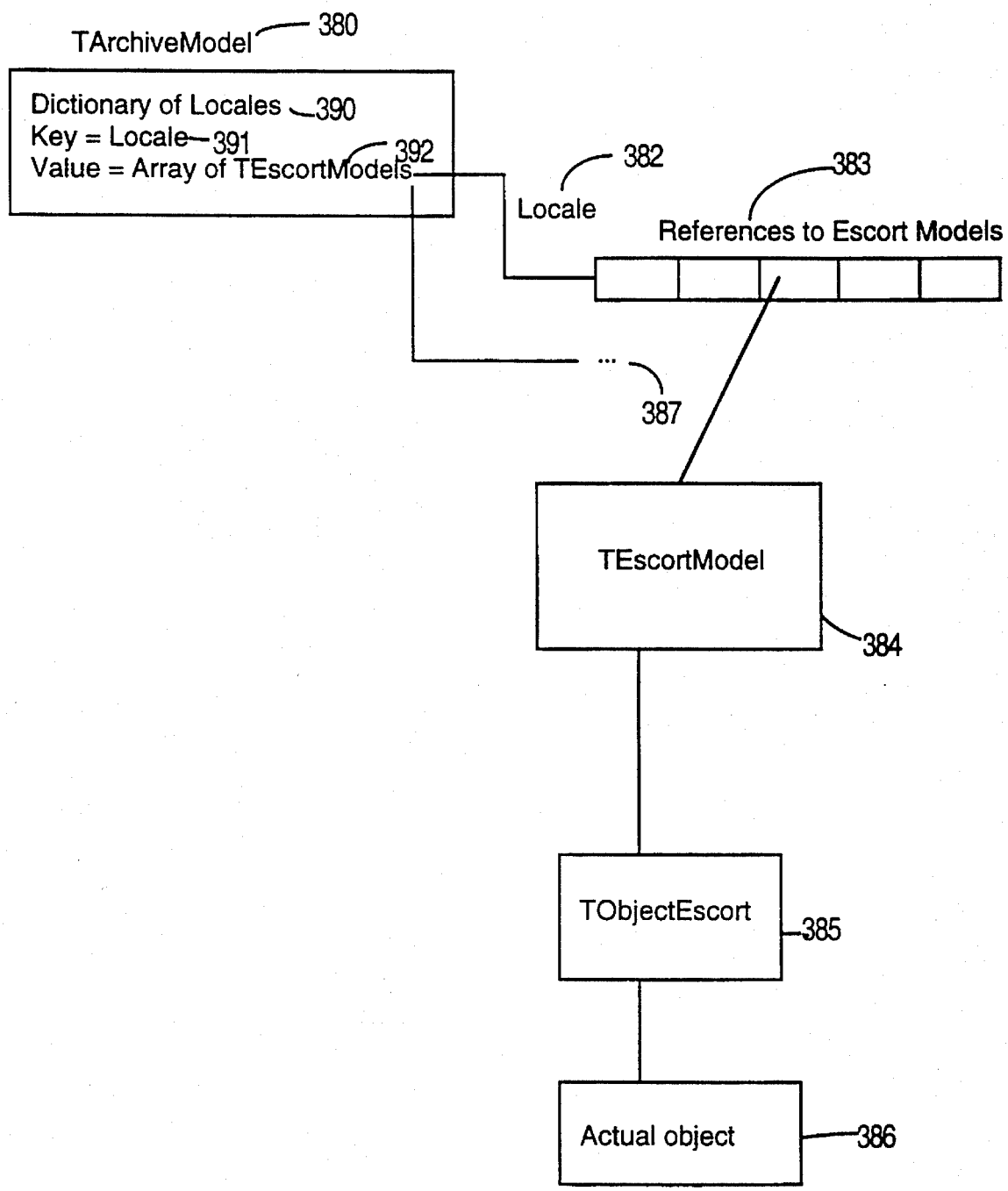
FIG. 3B is a block diagram of a TArchiveModel in accordance with a preferred embodiment of the invention.

FIG. 3B is a block diagram of a TArchiveModel in accordance with a preferred embodiment of the invention. The Constructor document contains a TArchiveModel 380, a subclass of TModel, the standard storage model of a TAL application. The TArchiveModel implements the locale tree with a TDictionary. The dictionary contains a sparse representation of the locale hierarchy 381. If an object exists in some locale 382, there is an item in the dictionary for the locale the object lives in. Empty locales are not stored in the dictionary 390. The key for retrieving items in the dictionary is a TLocale shown at label 391. The values stored in the dictionary are TArrays 392. Each element in the array is a TDocumentComponentReference 383. The reference eventually points to a subclass of a TEscortModel 384. The escort model contains one or more escorts. For example, the TEscortModel 384 contains a hierarchy of TViewEscorts (TObjectEscort 385) exactly matching the view hierarchy being edited. Each escort 385 has a pointer to the actual object 386.

The archive tree viewer (TArchiveTreeViewer) is a display class used for examining the contents of the Constructor document, or TArchiveModel. The TArchiveTreeViewer is based on an actual tree class. Each node in the tree is a TLocaleLabel that represents every locale in the Taligent locale hierarchy (not just the sparse locale hierarchy stored in the TArchiveModel). Each TLocaleLabel also holds references to each of the escort models stored in the locale. It uses these references to display the escort's name and to allow the user to directly manipulate the escort. The user can interact with the label to rename it, drag it to another locale to localize the object, cut and paste, etc. The tree and each label can be expanded and collapsed to show and hide information.

Constructor Locale Gallery

The Constructor Locale Gallery provides a view of all objects available in a particular locale in an archive. The view obeys archive locale searching rules and shows objects defined in one locale as well as those visible in parent locales. Therefore the view allows the developer to see the complete set of objects available for a particular locale.

Archive Structure

Figure 19:
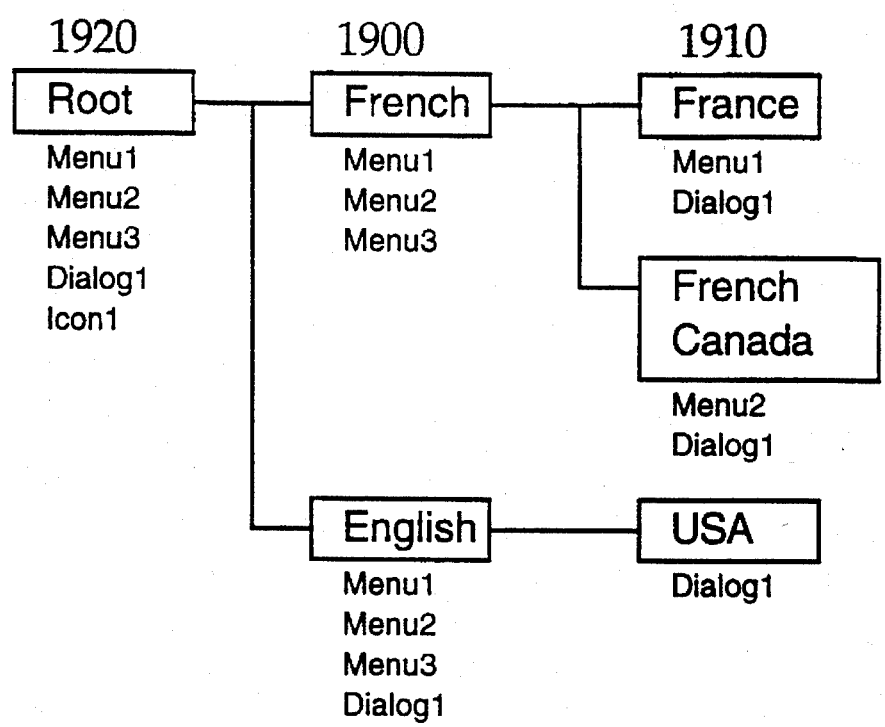
FIG. 19 is an illustration of a display of locale hierarchy in accordance with preferred embodiment.

Archives store named objects in a hierarchy. The objects stored are typically user interface elements or other items that may need to be customized for different languages or nationalities. As an example, FIG. 19 illustrates a typical archive hierarchy containing menus, dialogs and icons. The locales are arranged in a tree, starting at the "Root" locale. The hierarchy reflects the relationships among languages and places, so the "French" locale 1900 is the parent of both "France" and "French Canada" 1910.

Objects are stored in locales according to how much they have been customized. Completely generic objects that apply everywhere are stored in the Root locale 1920. Objects specific to a place are stored in that place's locale. When a program reads an object from the archive, for example when displaying a menu, it asks the archive for an object of a particular name for a particular locale. The archive searches the specified locale, returning the object if it is found. If not, the archive searches the parent locale for the named object, and continues searching all the way up to the Root locale if necessary. So, in the above example if my current locale were France and my program asked the archive for an object named "Menu1", the object stored in the France locale would be returned. If it asked for an object named "Menu2", the object stored in the French locale would be returned. If it asked for an object named "Icon1", the object stored in the Root locale would be returned.

The Constructor Locale Gallery

The Constructor Locale Gallery shows all the objects available to a program for a given locale. It in effect, "flattens" the locale hierarchy by merging the list of objects available in one locale with those in the ancestor locales, and eliminating duplicates. This view is useful to developers because it shows succinctly what objects will be associated with what names for the locale, and it also shows where the objects will be found.

The locale view is a completely new way of representing information for national language processing. Other systems show flattened hierarchies of objects, e.g. C++ browsers show inherited functions of a class. However, no other system organizes user interface objects into a hierarchically structured archive, and therefore there are no other systems that display flattened views of such objects. Also, a preferred embodiment displays visual representations of the objects, whereas other systems tend to display only names.

Figure 20:
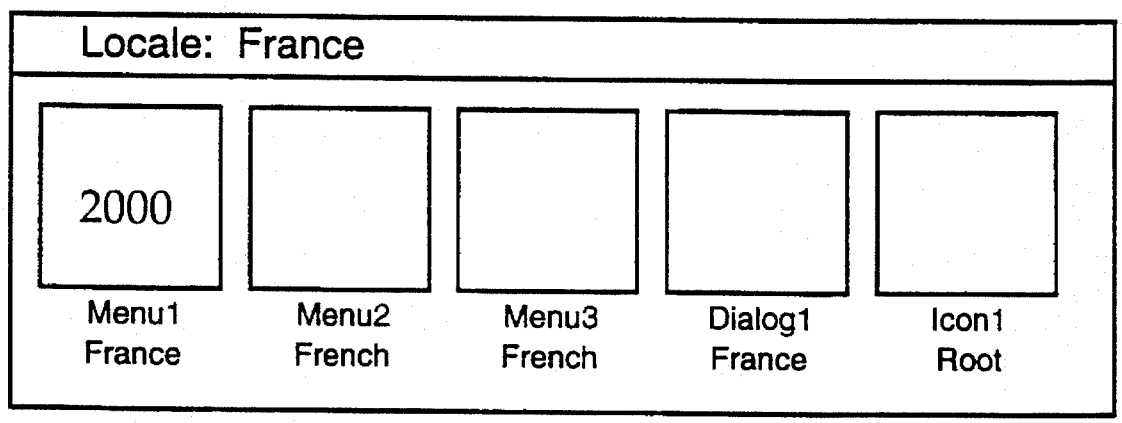
FIGS. 20–22 are illustrations of an alternative display of locales in accordance with a preferred embodiment.
Figure 21:
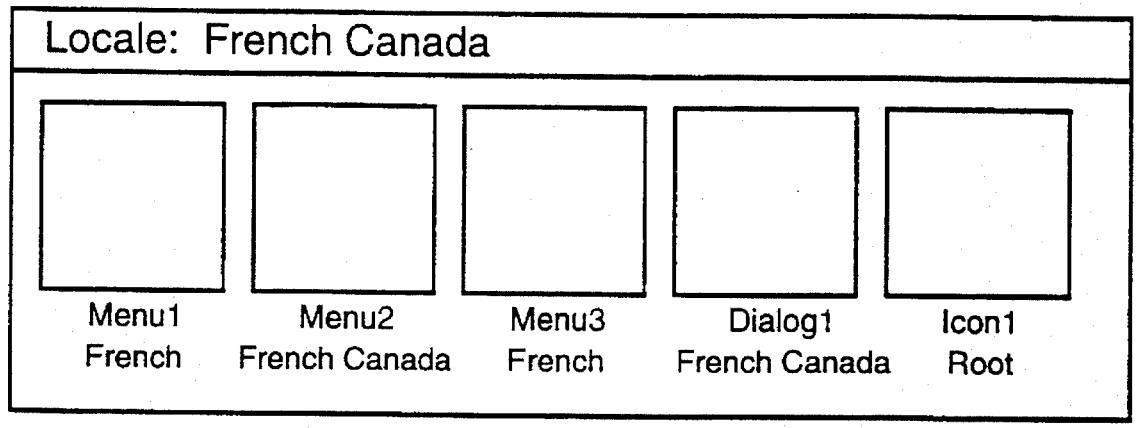
Figure 22:
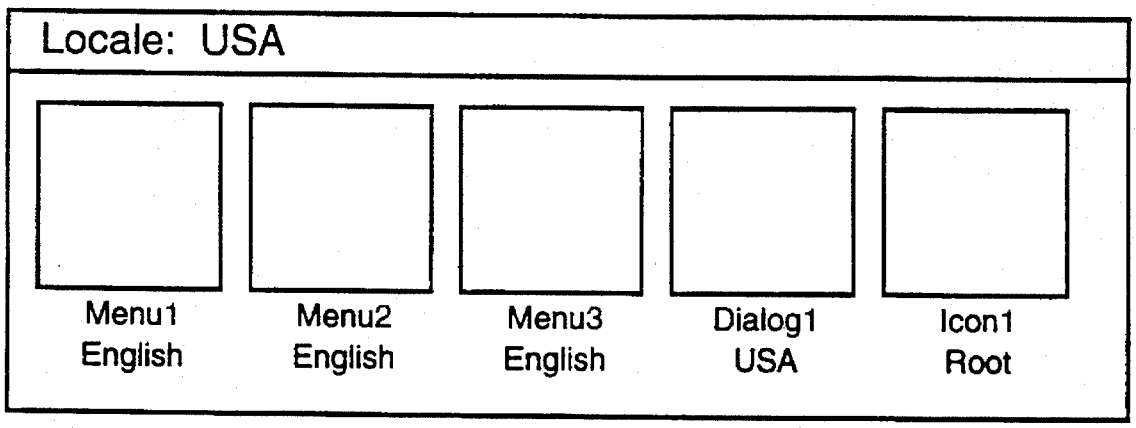

FIGS. 20–22 illustrate examples of locale gallery views for the three rightmost locales in the archive shown in FIG. 19. In these figures, the squares 2000 display thumbnails, i.e. reduced size renditions, of menus, dialogs, etc. Each thumbnail is labeled by the object name and the name of the locale containing the object. Note that the number of objects and their names is the same for all locales, but the thumbnails and the containing locale names can be different.

There are many display possibilities for the objects in the locale gallery. We have implemented two so far: 1) thumbnails of graphics objects, such as menus, dialogs and pictures; and 2) text strings, displayed in their associated styles and sizes. The thumbnails are the most general and can display all types of objects in the same view, as in the above example. If we constrain a gallery to show only one type of object, e.g. strings, we can display the objects in a form specific to their type.

The actual archive (TArchive) stored on disk and typically associated with a shared library is based on a THeterogeneousDiskDictionaryOf<TArchiveKey>. Each TArchiveKey consists of two parts: a text name or key, and a locale. Objects of every locale are all mixed together in the disk dictionary. Because of the way the objects are accessed, the structure of the archive appears as a tree structure to external users. Objects in an archive are typically accessed through a templatized TArchiveEnvelope<>. The archive envelope provides a type-safe mechanism for retrieving, replacing, and storing objects in an archive. When an archive envelope is asked to retrieve an object from a specific locale, it performs the following steps:

(1) Get the root locale
(2) Get the locale specified in the envelope to search
(3) Using the text key passed into the envelope, look in the archive's dictionary for an object with a TArchiveKey made up of the text key and the search locale.
(4) If the object is found, copy it and return it to the caller.
(5) If the object is not found and the search locale is the same as the root locale, throw an exception that says that the object wasn't found.
(6) Otherwise, put the parent locale of the search locale into the search locale.
(7) Goto step (3).

Accessing the Archive File

Figure 4A:
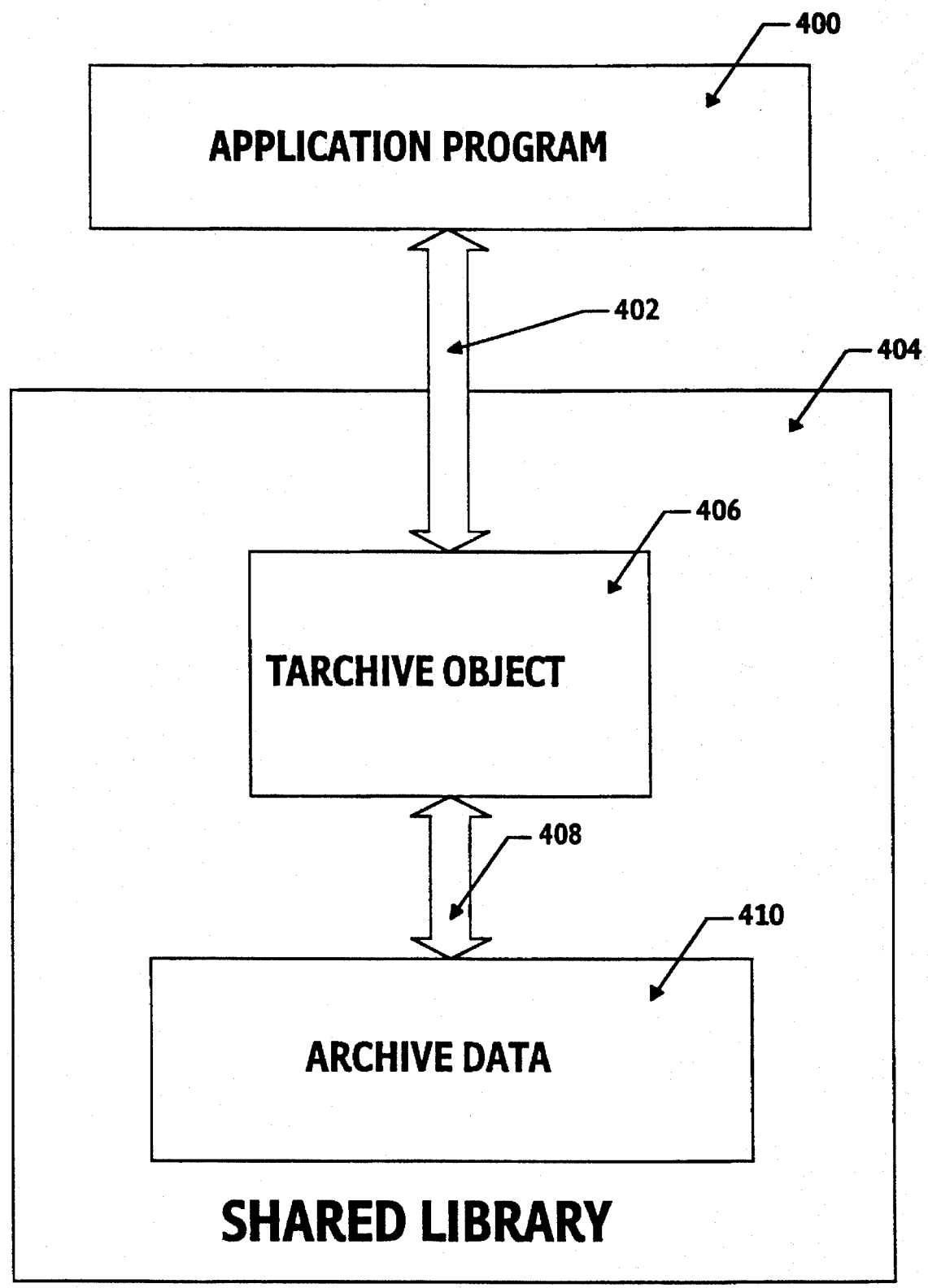
FIG. 4A is a simplified schematic block diagram illustrating how an application program retrieves user interface objects from an archive.

FIG. 4 is a stylized block diagram which illustrates how an application program actually accesses the archive objects. In FIG. 4, application program 400 obtains access to archive data 410 (comprising archived objects) by means of a "TArchive" object 406. The interaction between the application program 400 and the TArchive object 406 is illustrated schematically by arrow 402. The TArchive object 406, in turn, interacts with the archive data 410 as indicated schematically by arrow 408. The TArchive object is instantiated from the class TArchive and provides an interface through which the archived objects can be directly accessed by an application program. In order to use a TArchive object, a program developer creates an instance of the TArchive class in his application program code. The application program then can retrieve UI objects that were previously created with the constructor program (a process that will hereinafter be described in detail) and stored in the archive. An application program determines which archive to utilize by calling TArchive::CopyArchiveForSharedLibrary. This call interrogates the address of the caller on the CPU stack and utilizes the returned address to determine which shared library called the archive code. Once the shared library name is determined, the archive file name is accessible and the archive is opened.

As previously mentioned, the TArchive object provides a shared read-only access path to archived objects that it contains, but does not represent the stored data. Thus, a TArchive object can be created and destroyed without any effect on the archived objects which are accessed through the TArchive object. Since archives are actually part of a shared library, a TArchive object can be instantiated from the TArchive class using only the name of the shared library as a parameter in the constructor.

Figure 4B:
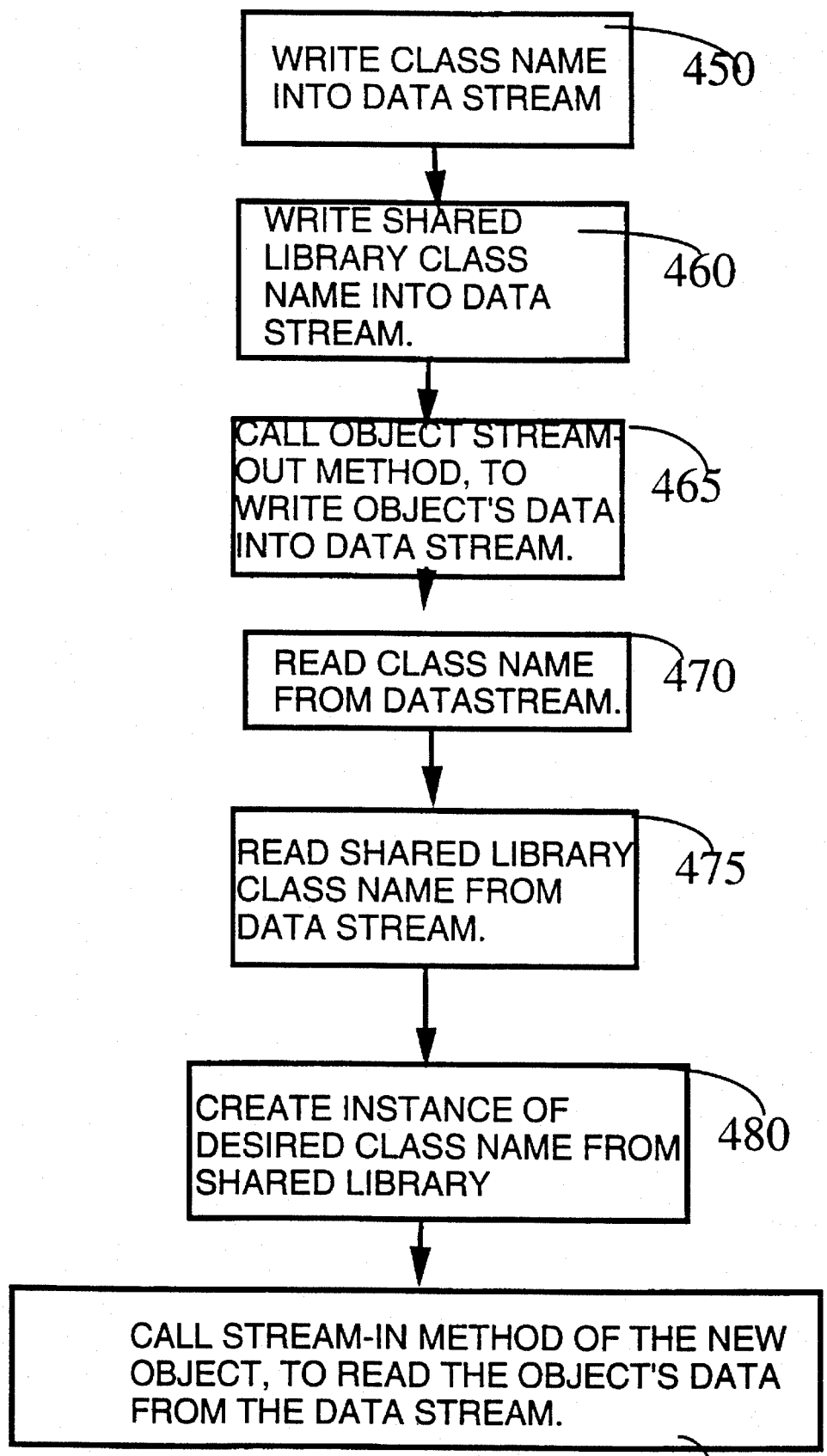
FIG. 4B is a flowchart in accordance with a preferred embodiment of flattening and resurrecting an object.

FIG. 4B is a flowchart in accordance with a preferred embodiment of flattening and resurrecting an object. To flatten an object, processing commences at function block 450 where the class name for a particular object that is to be flattened is written into the data stream. Then, the shared library class name is written into the data stream as shown in function block 460. Thereafter, the object stream-out method is called to write the object's data into the data stream. To resurrect an object, processing commences at function block 470 where an application reads the name of the class from the data stream, then at function block 475, the application reads the name of the shared library of the class from the data stream, creates an instance of the desired class from the desired shared library by name as shown at function block 480, and calls the stream-in method of the new object to read the object's data in from the data stream as shown in function block 490.

To create an instance of a desired class from a shared library by name, a library is loaded after an application has already started utilizing the techniques presented in U.S. Pat. No. 5,369,766 to Taligent, Inc. Then, a constructor function name is synthesized from the name of the class, and the classes default constructor function is invoked utilizing the techniques presented in U.S. Pat. No. 5,369,766 to Taligent, Inc., which results in the creation of a new object of the desired type.

Once a TArchive object has been instantiated, a copy of an individual object in the archive is retrieved via a member function in the TArchive object. In accordance with the description of the locale hierarchy above, a request for an object in a specific locale can return either the localized object requested or a less specific version of the object which is found in another local located at a higher locale level. The TArchive object generally has two member functions which can be used by an application program: CreateArchive(shared library) and CloneArchiveObject(name, locale). The first of these functions is used to create an instance of a TArchive object which creates an access path to or "opens" the archive in the specified shared library and returns a pointer to the created object.

Once the TArchive object has been created, the CloneArchiveObject(name, locale) member function can be called to retrieve objects by name and locale from an open archive. The retrieved object is streamed out of the archive to the application program where it can be used to generate displays.

The Constructor Program

The UI objects which are stored in an archive are actually created via a separate "constructor" program which is used by application developers to edit standard UI objects and to create new UI objects. In order to meet the goal of providing a fully extensible program that is capable of handling any type of newly-created UI object, it is necessary for the constructor program to have no built-in knowledge about the internal construction of the objects that it is creating and manipulating. If no such built-in knowledge is coded into the constructor program, when an new object is created it will not be necessary to rewrite the constructor program code to handle the new object.

There are several methods of accomplishing the goal of full extensibility. One method is to create a special "constructor class" and make all UI objects descend from this class so that all UI objects are "constructible". For example, the special constructor class might have a specific protocol for sizing objects, moving them, editing them, drawing handles around their frames, drawing certain kinds of visual feedback and putting the object into "special" states (the "special" states would allow the constructor program to make objects respond differently to events that the objects would normally respond. For example, clicking on a button in one state would select the button instead of pushing the button as normally occurs). These special states allow the objects to be edited rather than to act as they would in an actual operating program.

The problem with this latter approach is that a newly-created UI object could only be easily used with a predesigned constructor program if it descended from the special constructor class. Since many existing objects, such as text strings and sounds currently did not descend from this class and could not easily be made to descend from this special class, it would be necessary to wrap these objects with another object that was "constructible" and store the combined object in an archive. In addition, in a further problem is that the "constructible" objects had to include extra functions and instance variables so that they could be used with the constructor program. These extra functions and variables then would be retrieved from the archive along with the object and take up space in the application program space even though they would never be used by the application program.

Interfacing the Constructor Program with Archive Files

Accordingly, in accordance with the a preferred embodiment of the invention, instead of creating UI objects which are themselves "constructible", each UI object is contained in a special "escort" object. The escort objects are constructible and are the objects that actually interface with the constructor program. Thus, when an object is created by the constructor program, an escort object unique to the UI object is also created. Both the UI object and the escort object are stored at the appropriate locale in the constructor document. The UI element is ultimately stored at the appropriate locale in the archive.

Figure 5:
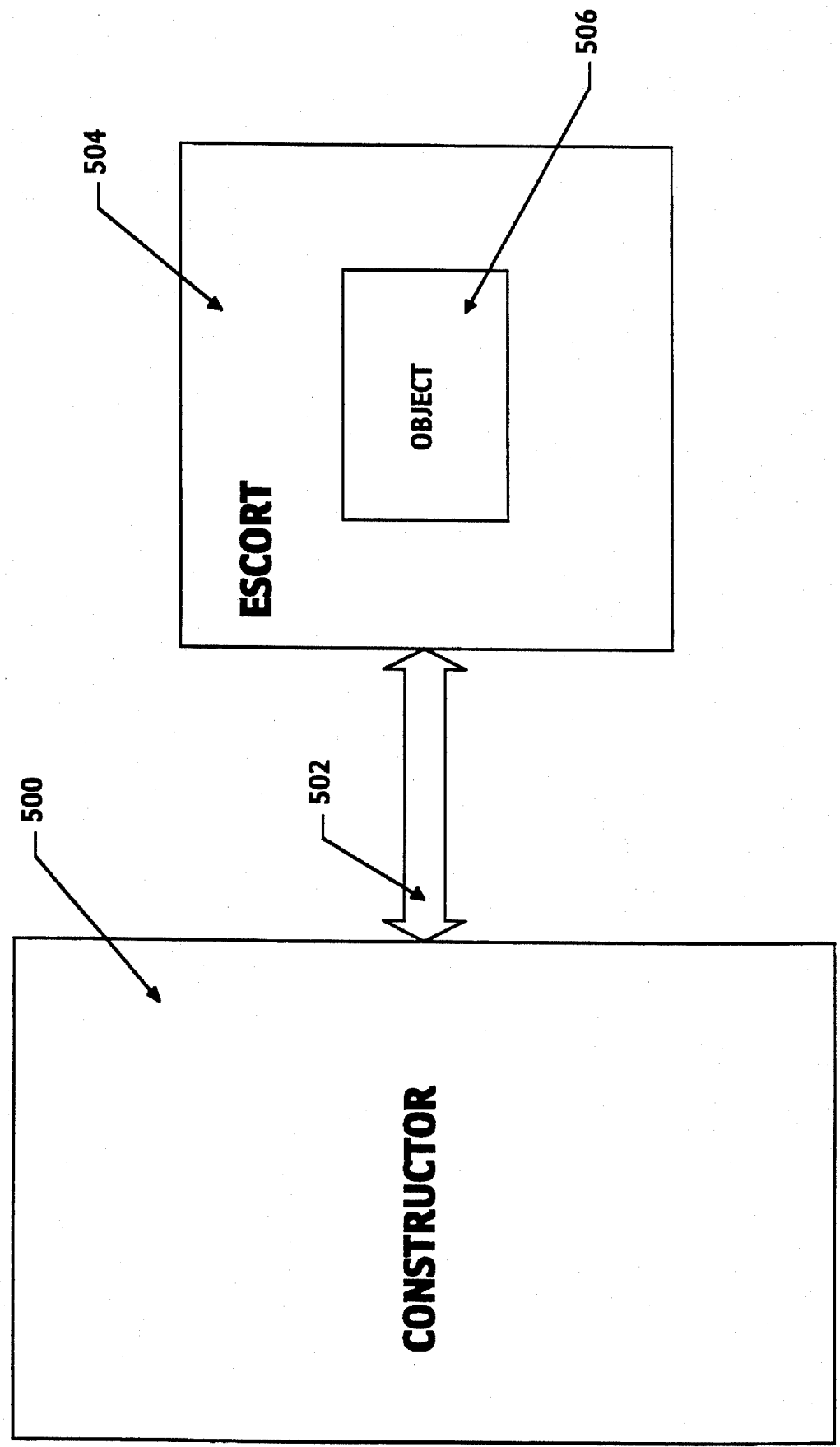
FIG. 5 is a simplified block schematic diagram illustrating how a constructor program interfaces with user interface objects via escort objects to allow editing of the user interface objects.

When the object is to be edited, the constructor program interfaces with the escort object. This latter relationship is shown in FIG. 5. In particular, constructor program 500 interacts with an escort object 504 as indicated schematically by arrow 502. Escort object 504, in turn, wraps the actual UI object 506 and passes translated commands to the UI object. In accordance with the escort object approach, the constructor program does not manipulate the actual screen display generated by an object. Instead, the constructor program manipulates the escort. As the screen manipulation is progressing, the attributes which are apparent on the graphical representation of the object on the screen are transferred into the object itself by the escort object. When the escort is invoked, it defers the drawing to the escorted object's method. Therefore, any changes made to the escort are immediately visible.

In accordance with the principles of the invention, when an archived object is requested, the related escort object is queried and streams out the attributes of the UI object. The escort object itself remains in the archive. Therefore, functions and variable instances which are necessarily included in the escort object which allow it to interact with the constructor program do not end up in the application program. Each UI object must be associated with its own unique escort object. While "standard" escort objects are included in the constructor program for "standard" UI objects, any UI object that is created by a program developer must also have an associated escort object. The developer may or may not have to create a new escort object. If the developer-created UI object has new protocol (not inherited from the UI object's base class) that the developer wants users to be able to inspect and modify, a custom escort must be developed. Otherwise, the developer can simply use the base-class escort object.

Figure 6:
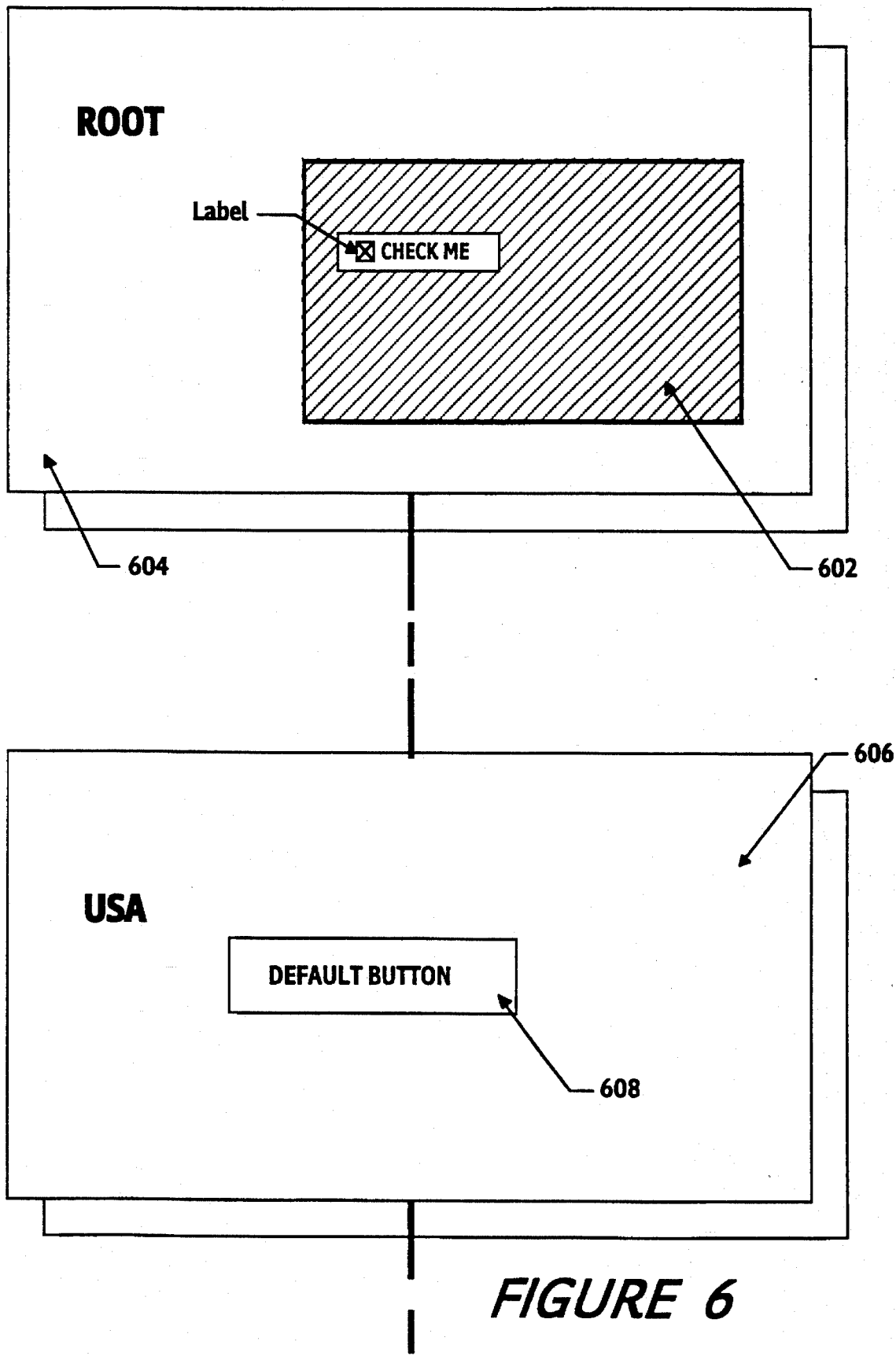
FIG. 6 is a simplified block diagram showing a portion of the locale tree shown in FIG. 3A illustrating the manner of storing user interface objects at each locale.
Figure 7:
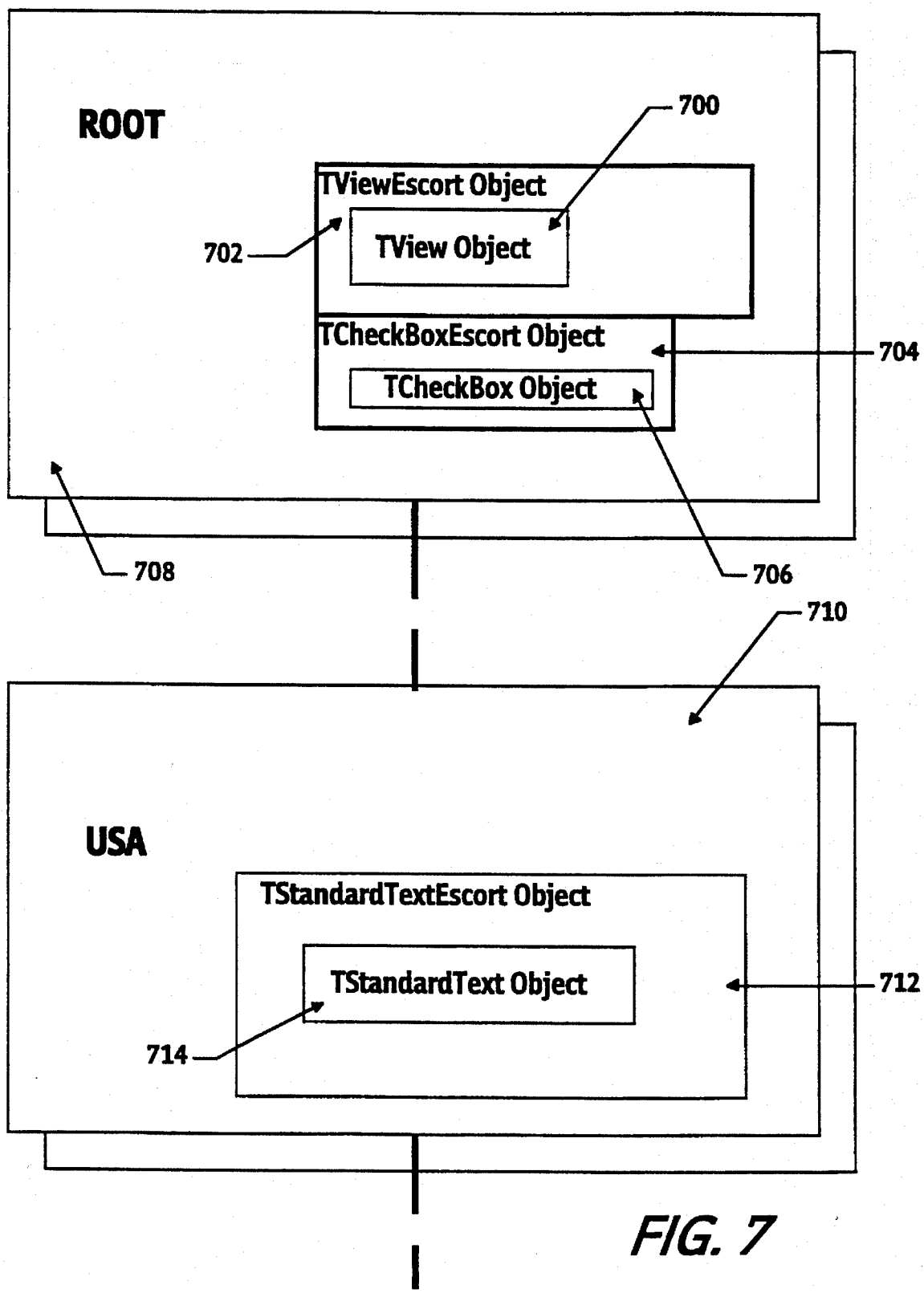
FIG. 7 is a simplified block diagram showing a portion of the locale tree shown in FIG. 3A illustrating the manner of encapsulating each user interface object in an associated escort object.

FIGS. 6 and 7 illustrate a portion of the locale tree shown in FIG. 3A illustrating various UI objects which are stored at specific locale levels. As an illustration, the screen displays which are generated by the objects as they would appear in a program are illustrated in FIG. 6. A schematic representation of the underlying escort objects that are stored in each locale level are shown in FIG. 7. In particular, FIG. 6 shows an expanded view of the root locale 604 and the USA locale 606. Root local 604 contains two objects: a view object 602, which essentially comprises colored window and is depicted as a shaded rectangle, and a checkbox object 600. The USA locale includes a text string 608 containing the text "DEFAULT BUTTON".

FIG. 7 shows the underlying organization of the constructor utilizing escort objects for the UI objects shown in FIG. 6. In particular, in FIG. 7, the root locale 708 contains two escort objects: a TViewEscortObject and a TCheckBoxEscortObject which are associated with the two UI objects illustrated in FIG. 6. The screen display 602 is created by a TViewObject 700 which is escorted by the TViewEscortObject 702. The checkbox screen display 600 is a subview of the view 602 and, accordingly, it is contained a subobject. This subobject is shown as a TCheckBoxObject 706 which is escorted by a TCheckBoxEscortObject 704. In a similar manner, the text string 608 is created by a TStandardTextObject 714 located in the USA local 710 and the TStandardTextObject is contained within a TStandardTextEscortObject 712.

The actual arrangement of the data in the data storage would appear essentially as set forth below. It should be noted that this data storage mapping is for illustrative purposes only corresponds to the UI and escort objects shown in FIGS. 6 and 7. For other views and escort objects, alternative data structures would be stored in archive.

Figure 23:
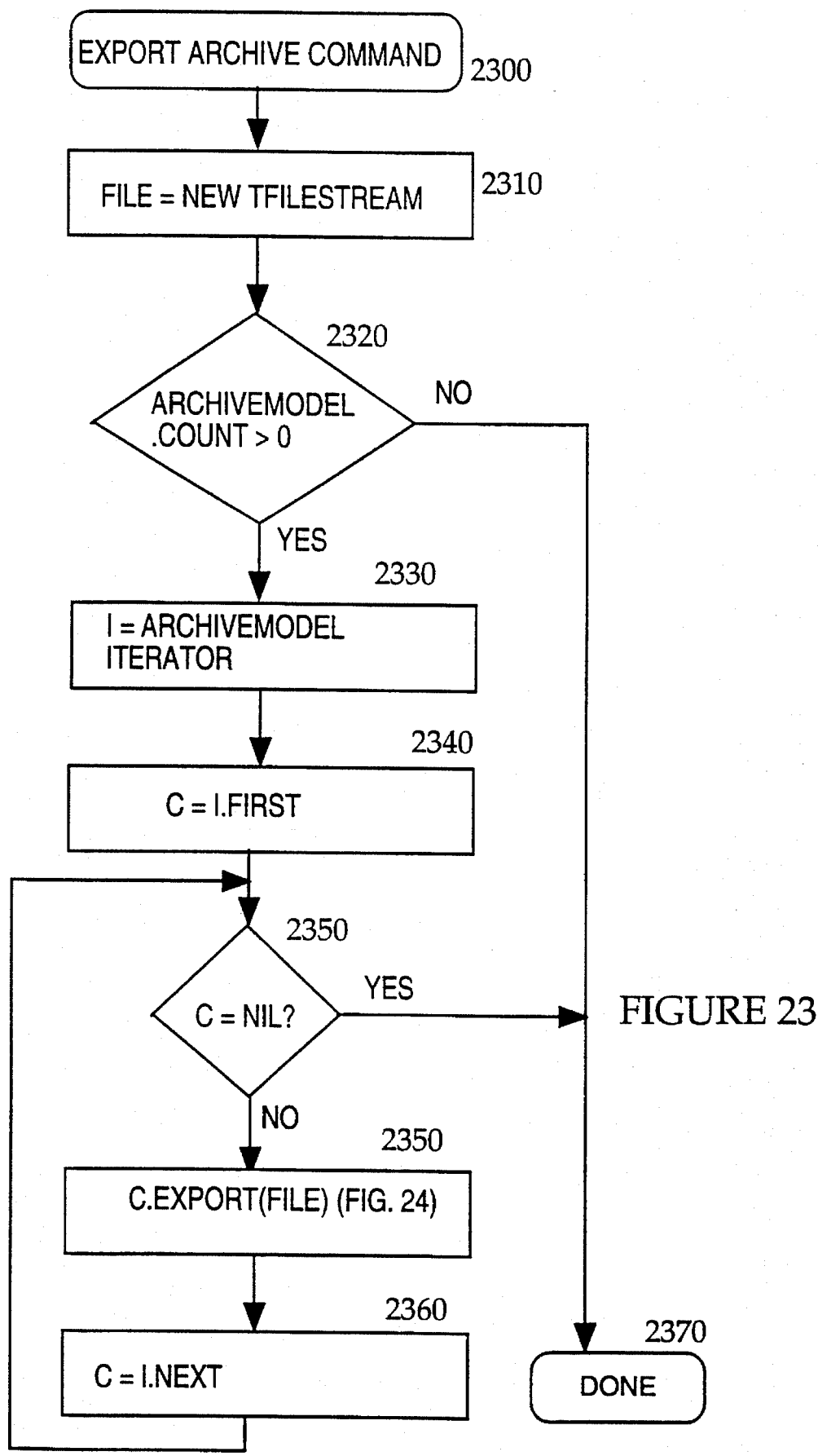
FIGS. 23–25 are detailed flowcharts of export logic in accordance with a preferred embodiment.
Figure 24:
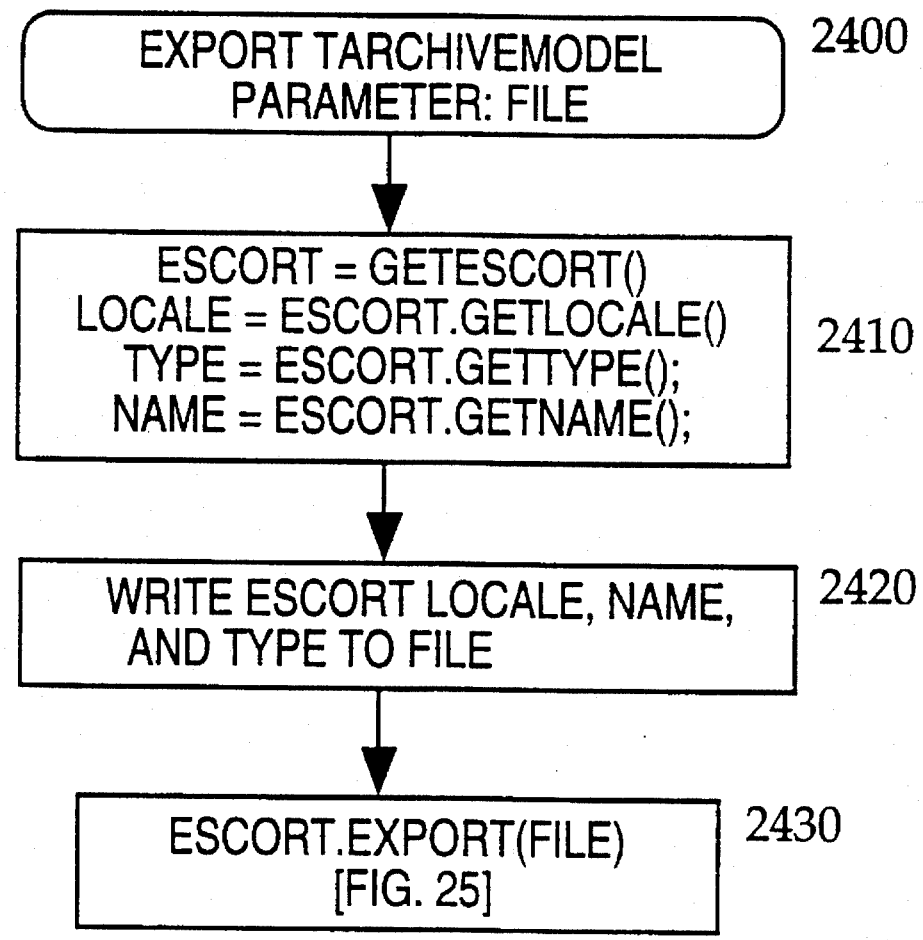
Figure 25:
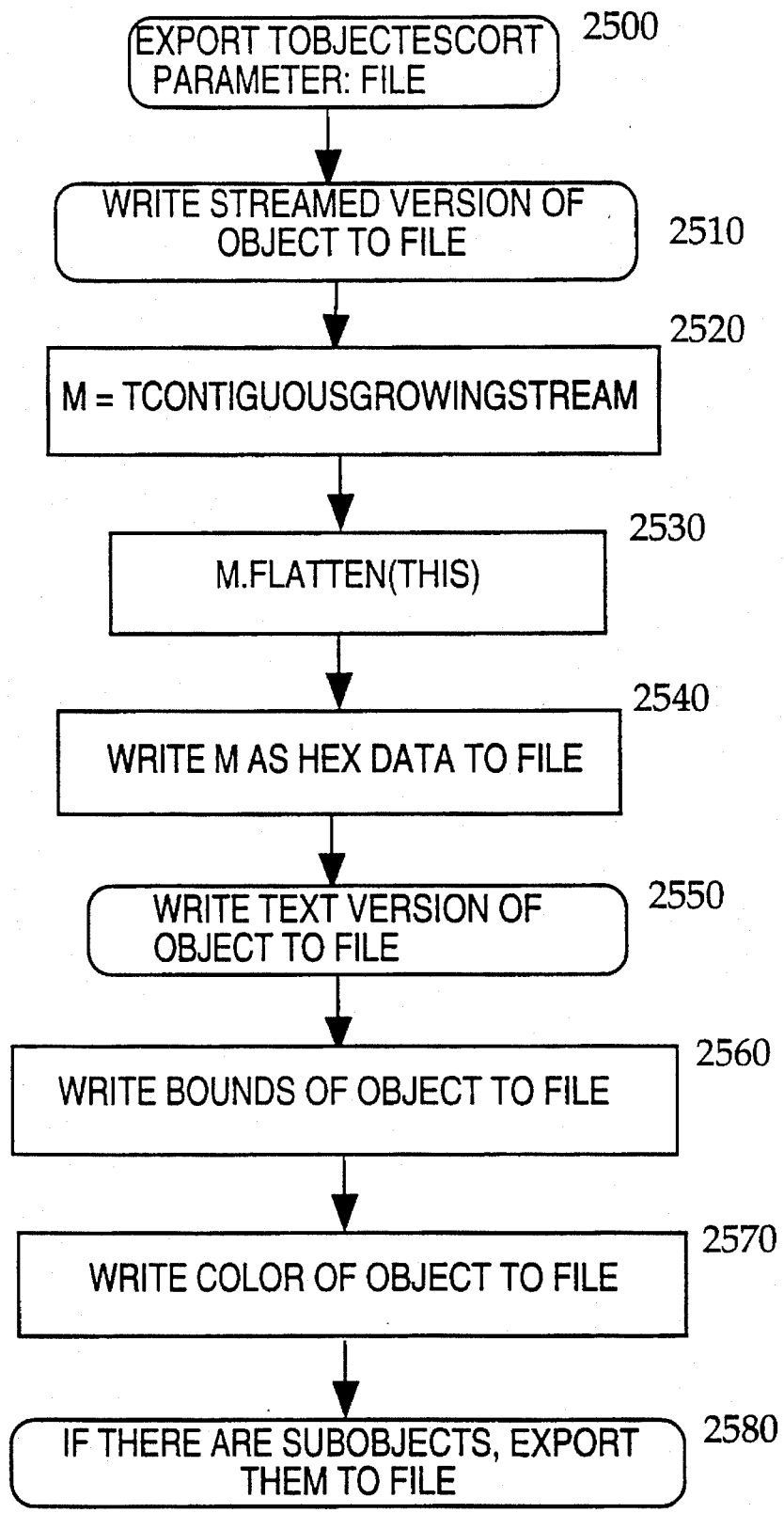

FIGS. 23–25 are detailed flowcharts of export logic in accordance with a preferred embodiment. Processing commences in FIG. 23 at label 2300 where an export archive command is detected by the system. The first step in the processing is to open a file for the export processing as shown in function block 2310. Then at decision block 2320 a test is performed to determine if there are any objects to export. If not, then processing is done and control is passed to terminal 2370. If there are objects to export, then an iterator is set as shown in function block 2330, the first object is extracted at function block 2340, and a test is performed at decision block 2350 to determine if the object is equal to a nil value. If so, then processing is complete and control is passed to terminal 2370. If the object exists, then at function block 2350, an export record is written to the file in accordance with the detailed logic presented in FIG. 24, the count is iterated and control is passed to decision block 2350 to test and process the next record.

FIG. 24 presents the detailed logic associated with creating export records in accordance with a preferred embodiment. Processing commences at terminal 2400 where an archive record model is subclassed from TArchiveModel. Then, at function block 2410, the record fields are instantiated, the record is written to the file as shown in function block 2420, and the escort file is written as shown in function block 2430 and detailed in FIG. 25.

FIG. 25 presents the detailed logic associated with streaming a file out to an escort file in accordance with a preferred embodiment. Processing commences at terminal 2500, where the command to export the record to the escort file is encountered. Then, the streamed version of an object is written to the file as shown in function block 2510, a temporary variable M is equated to the contiguous streamed version of the object in function block 2520, the temporary variable M is flattened in function block 2530, written as hex data to a storage medium as shown in function block 2540, written as a text version to the file as shown in function block 2550, the bounds of the object are written to the file as shown in function block 2560, the color of the object is written as shown in function block 2570, and if there are subobjects, they are exported to the file in the same manner as the objects as shown in function block 2580.

The importing of objects from an archive is performed in a similar manner as shown in FIGS. 26-30 which are detailed flowcharts of import logic in accordance with a preferred embodiment. Processing in FIG. 26 commences at terminal 2600 where an import archive command is first encountered. Encountering the command immediately results in an import file being opened as shown in function block 2610, instantiation of an importer as shown in function block 2620 and parsing the file as shown in function block 2630 and detailed in FIG. 27.

Figure 27:
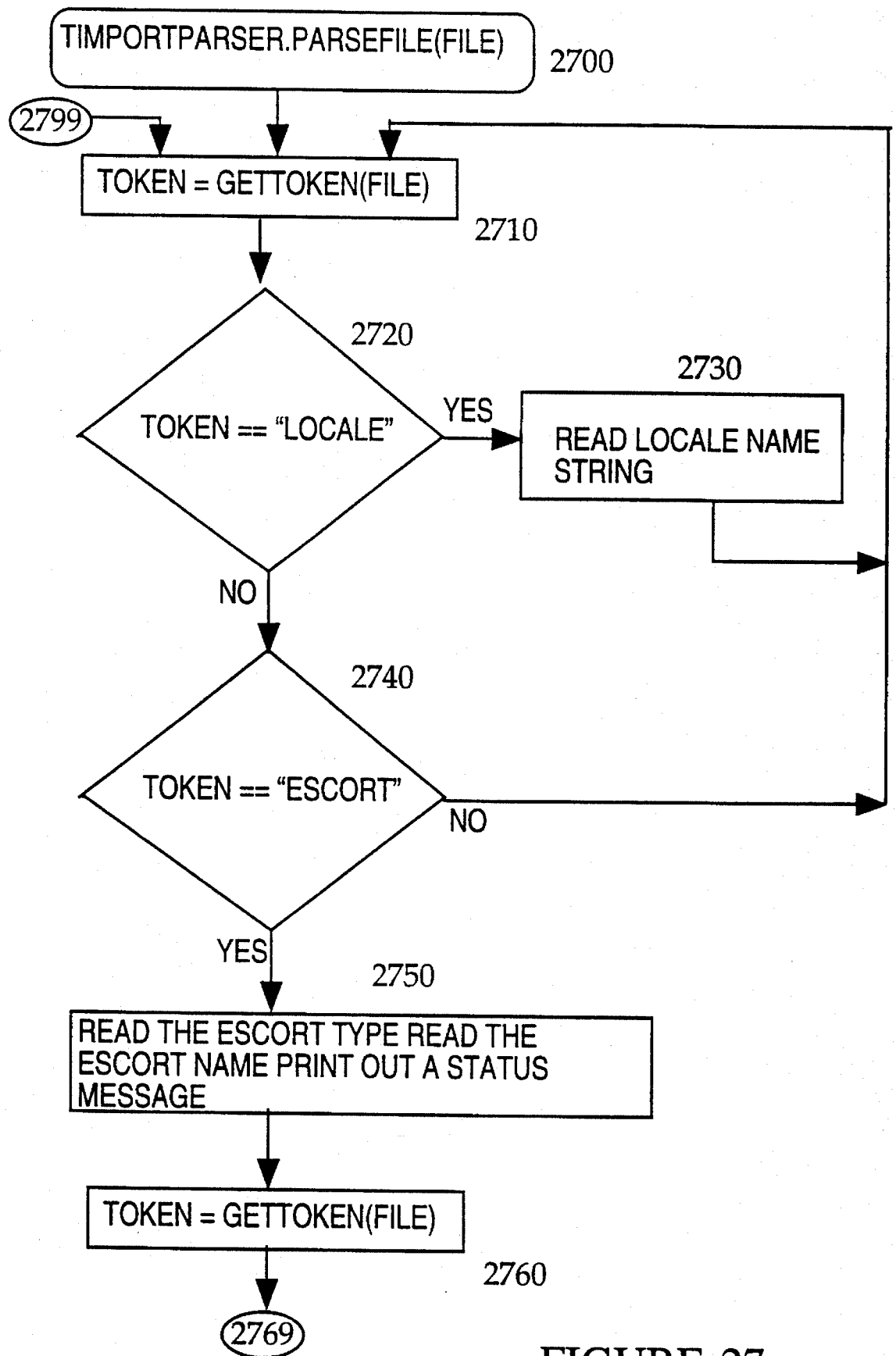
FIGS. 26–30 are detailed flowcharts of import logic in accordance with a preferred embodiment.

FIG. 27 presents the detailed logic associated with parsing an import file in accordance with a preferred embodiment. Processing commences at terminal 2700 where a file to be imported is presented for processing. First, the file is scanned to identify the first token as shown in function block 2710 and an immediate test is performed at decision block 2720 to determine if the token is a Locale. If it is, then the string is parsed to determine the locale name as shown in function block 2730 and control is passed to function block 2710 to get the next token which should correspond to the named. If the token is not Locale, then a test is performed at decision block 2740 to determine if the token is an Escort. If not, then control is returned to function block 2710 to get the next token. If the token is an escort, then the escort type and name is read, a status message displayed and the next token is obtained as shown in function block 2760. Then control passes to FIG. 28 via terminal 2769.

Figure 28:
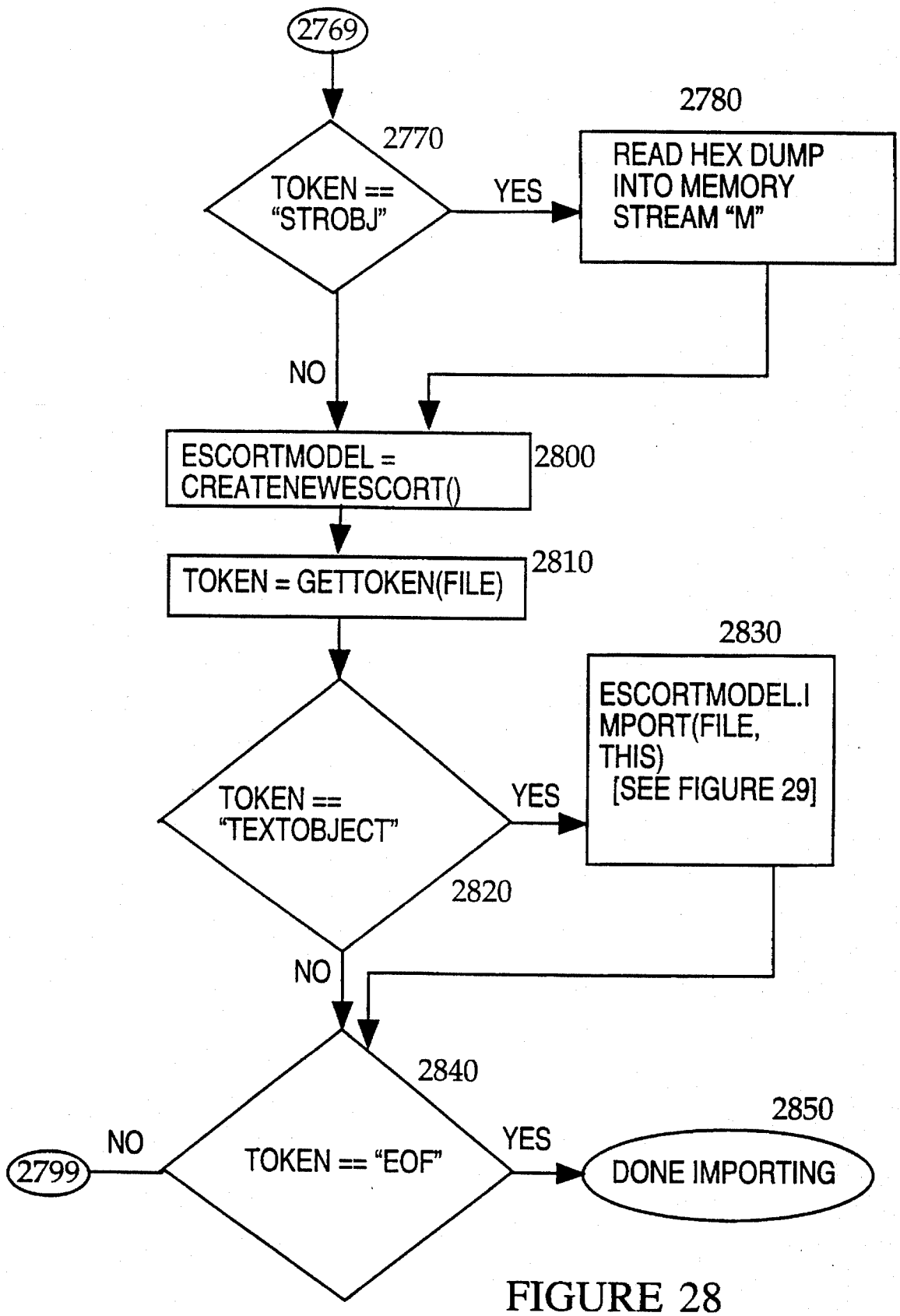

FIG. 28 continues the detailed logic associated with parsing an import file in accordance with a preferred embodiment. Processing commences when control is passed via terminal 2769 to decision block 2770 to test for a streamed object. If the object is streamed, then a temporary variable M is utilized for storing the hex dump retrieved from the file and control is passed to function block 2800. If the token does not indicate a streamed object at decision block 2770, then control is passed directly to function block 2800 to instantiate a new escort, the next token is obtained at function block 2810 and a test is performed at decision block 2820 to determine if a textobject is being imported. If so, then the text object is imported as shown in function block 2830 and detailed in FIG. 29. Then, control passes to decision block 2840 to determine if the end of the file has been reached. If so, then processing is done, and control passes to terminal 2850. If not, then control passes via terminal 2799 to function block 2710 to process the next token.

Figure 29:
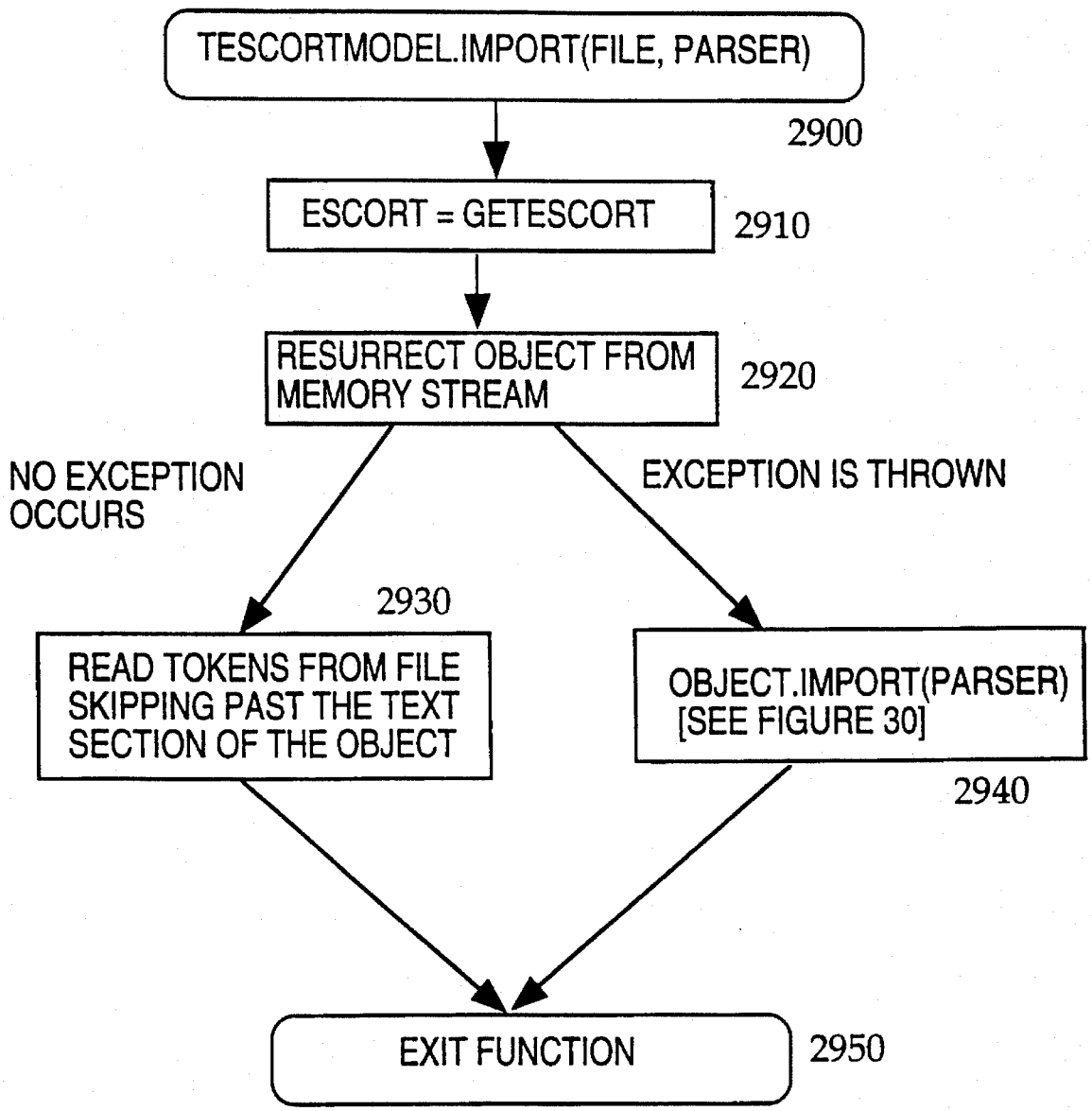
Figure 26:
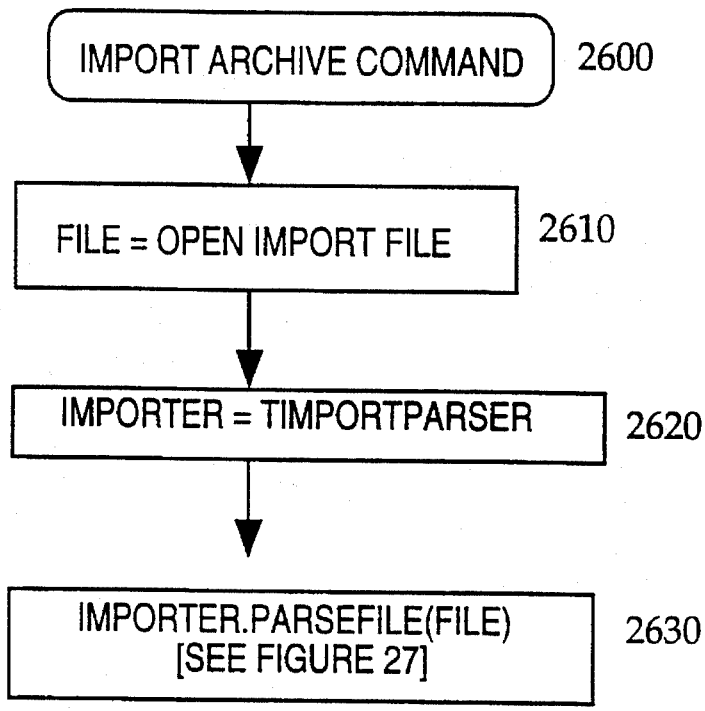

FIG. 29 is a flowchart of the detailed processing associated with processing a text object in accordance with a preferred embodiment. Processing commences at terminal 2900 when a text object is encountered. Then, at function block 2910, an escort object is instantiated, the text object is resurrected from the memory stream and if no exception is thrown, then tokens are processed from the file after the text section of the object and processing is terminated at terminal 2950. If an exception is detected when the object is resurrected at function block 2920, then the object is imported in accordance with the logic presented in FIG. 30 as shown at function block 2940, and processing is completed at terminal 2950.

Figure 30:
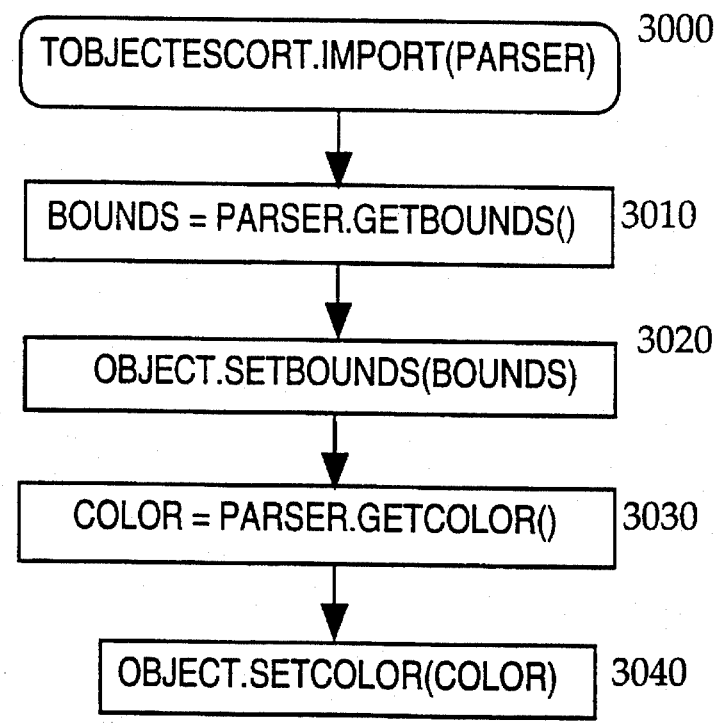
Figure 31:
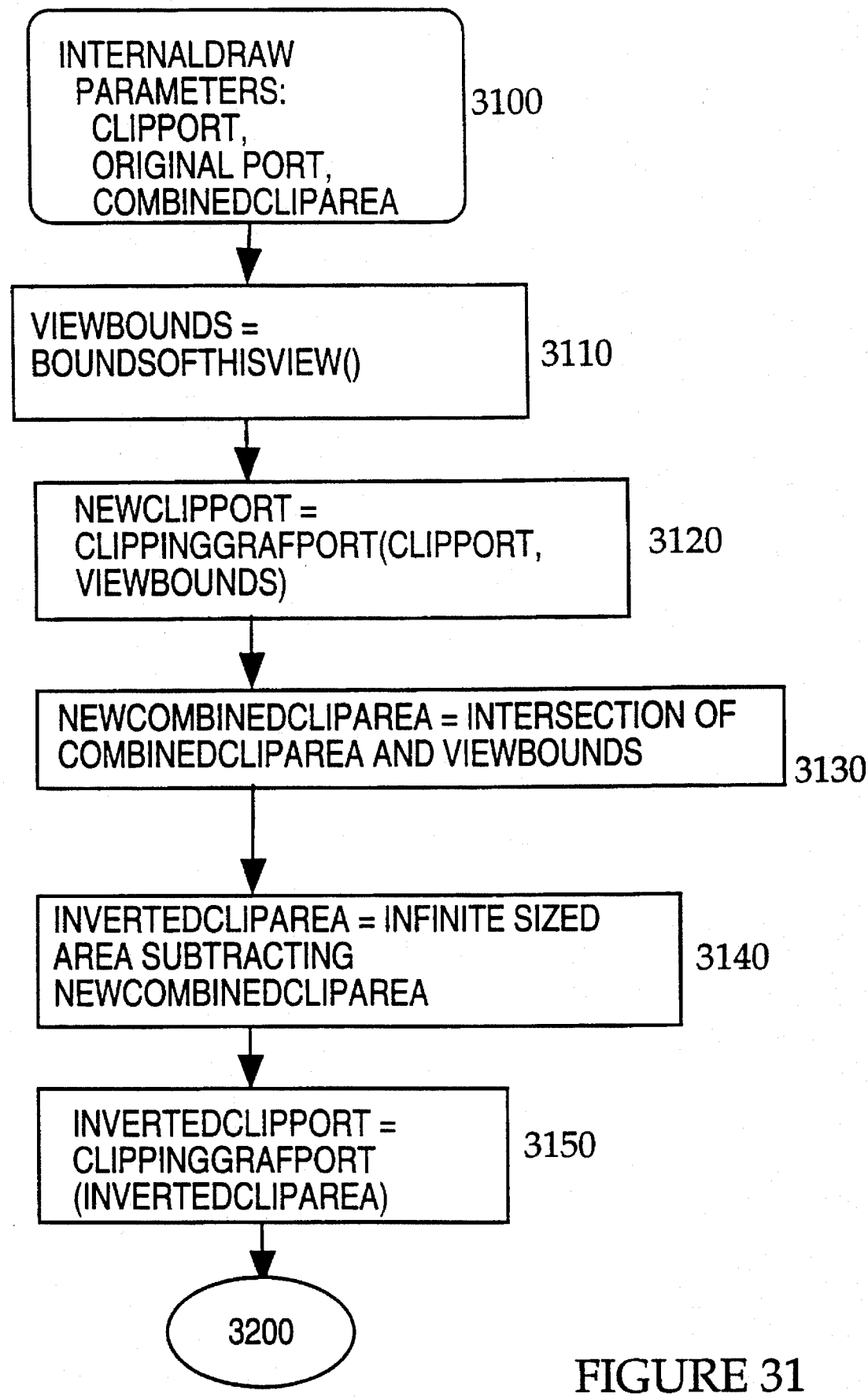
FIGS. 31–32 are detailed flowcharts of clipping logic in accordance with a preferred embodiment.
Figure 32:
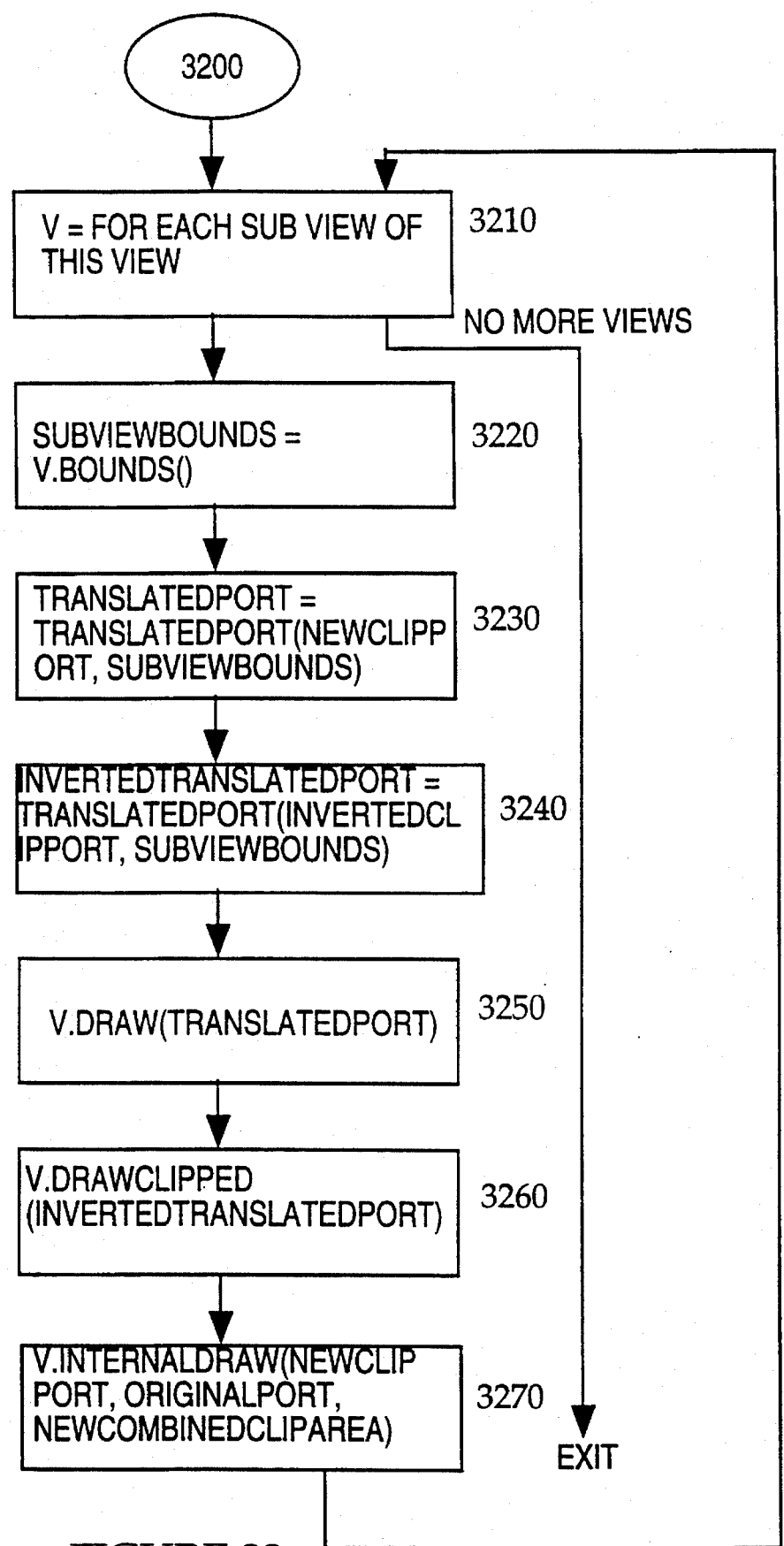

FIG. 30 is a flowchart of the logic associated with importing objects in accordance with a preferred embodiment. Processing commences at terminal 3000 where an object import command is detected. Then, at function block 3010, the object's bounds are initialized, the object's bounds are set at function block 3020, the color is obtained at function block 3030 and the object's color is set at function block 3040. When importing an object from the text portion of the import file, a generic object of the type specified by the import data is created. Next, the various attributes are read from the import file (such as bounds, color, checked or not checked, enabled or disabled, etc.) and applied to the newly created object. FIGS. 31–32 are detailed flowcharts of import and export logic in accordance with a preferred embodiment.

Import Export Analogy

Other systems support exporting resource data as text. Macintosh has Rez/Derez. None, however, supports two different representations of each object in the exported file. Here's a corny analogy of the way Constructor's export/import works:

A backpacker is leaving on a long trek. He'd like to take along "real" food, but he knows that would be too bulky and heavy. As a compromise, he takes along many packages of freeze dried food. Being smart, and wanting to prepare himself for any contingency or emergency, he decides to take along printed recipes for all the freeze dried food packets. If his freeze dried food gets destroyed or lost, he'll still be able to survive on his recipes even though it will be more work to prepare the food and the food might not be exactly what he expected.

When Constructor exports an object and its escort, it writes a "freeze dried" version of the object to the text file. The exporter also writes a textual description of the object for emergency purposes. On import, Constructor tries to reconstitute the freeze dried object. If that proves impossible, because something in the system has changed that renders the freeze dried object obsolete, Constructor will create a new object from the text "recipe" saved in the text file.

```
Locale Root
Escort TViewEscort "My ColorView" {
    hex {
        ffff7717ca7d7a7f7d7d7a77e732512532
        ffff7717ca7d7a7f7d7d7a77e732512532
        ffff7717ca7d7a7f7d7d7a77e732512532
        ffff7717ca7d7a7f7d7d7a77e732512532
        ffff7717ca7d7a7f7d7d7a77e732512532
    }
    Object TView {
        100., 100              //position
        10., 10., 20., 20.     //bounds
        .6, .7, .8             //RGB color bundle
        SubEscort TCheckBoxEscort {
            hex {
                ffff7717ca7d7a7f7d7d7a77e732512532
                ffff7717ca7d7a7f7d7d7a77e732512532
                ffff7717ca7d7a7f7d7d7a77e732512532
                ffff7717ca7d7a7f7d7d7a77e732512532
                ffff7717ca7d7a7f7d7d7a77e732512532
            }
            Object TCheckBox {
                100., 100              //position
                10., 10., 20., 20.     //bounds
                "CHECK ME"             //label
                ""                     //action message
            }
        }
    }
}
Locale USA
EscortTStandardTextEscort "Label String" {
    hex {
        ffff7717ca7d7a7f7d7d7a77e732512532
        ffff7717ca7d7a7f7d7d7a77e732512532
        ffff7717ca7d7a7f7d7d7a77e732512532
        ffff7717ca7d7a7f7d7d7a77e732512532
        ffff7717ca7d7a7f7d7d7a77e732512532
    }
    Object TStandardText {
        "DEFAULT BUTTON"
    }
}
```

As shown above, each user interface object as enclosed in an escort object actually consists of set of data. Consequently, the set of data which represents the user interface object can be cut and pasted into other documents just like any other data such as, text data, spreadsheet data or graphic data. The characterization of the user interface elements as "data" means that a program developer can create a dialog box (for example) using the constructor program, paste the data representing the dialog box into an e-mail message or a word processing document and send the document to another developer. The latter developer can then copy the dialog box data out of the incoming document and paste the data into an actual programming project. Thus, the program code written by a first developer can easily be transported to another program.

Constructor Program Components

As previously mentioned, objects and escort objects are created and edited by means of a "constructor" program. The main components of the constructor program are viewer objects, inspector objects and editor objects. Each of these components are used to either view or edit an archived UI object. The constructor program does not have its own built-in viewers and editors. Instead a viewer object is associated with an escort. There are also several viewers for examining archives. A text file is utilized for mapping objects and escorts to viewers. The file dynamically modifies the editor utilized for a particular object without recompiling any code. This architecture facilitates the exchange of editors without requiring access to the Constructor source code. When a developer wishes to view the archive, the constructor program utilizes the routines in the associated viewer object. Similarly, when a developer wishes to view an object, an inspector or an editor designed to interface with the object is used to inspect or edit the object. In this manner, the constructor program can be easily extended to operate with newly-designed UI objects by simply developing new inspectors and editors for these objects and registering them in a configuration file.

Figure 8A:
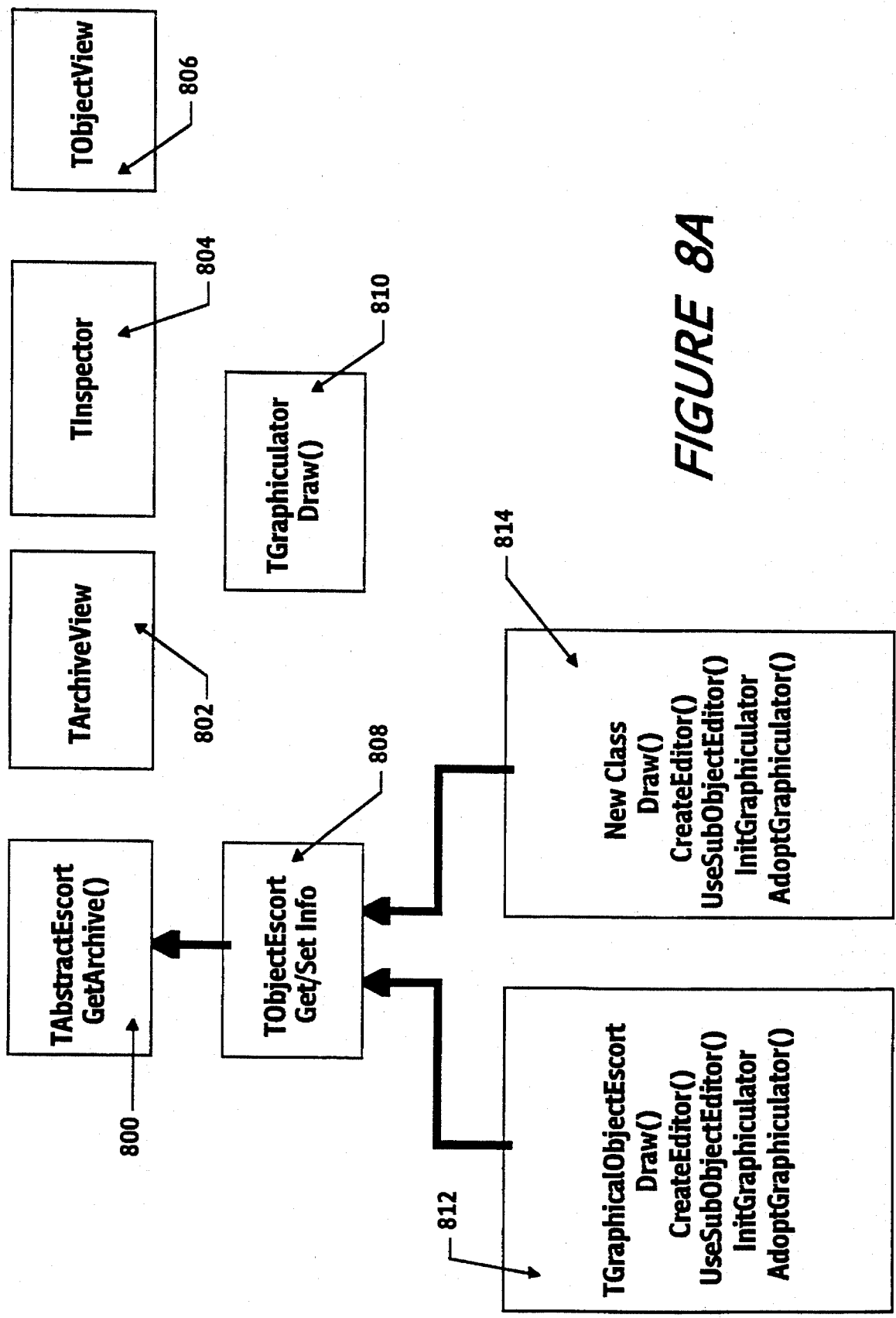
FIGS. 8A and 8B are class hierarchy diagrams illustrating the base class, subclasses and associated classes involved in a preferred embodiment of the constructor program.
Figure 8B:
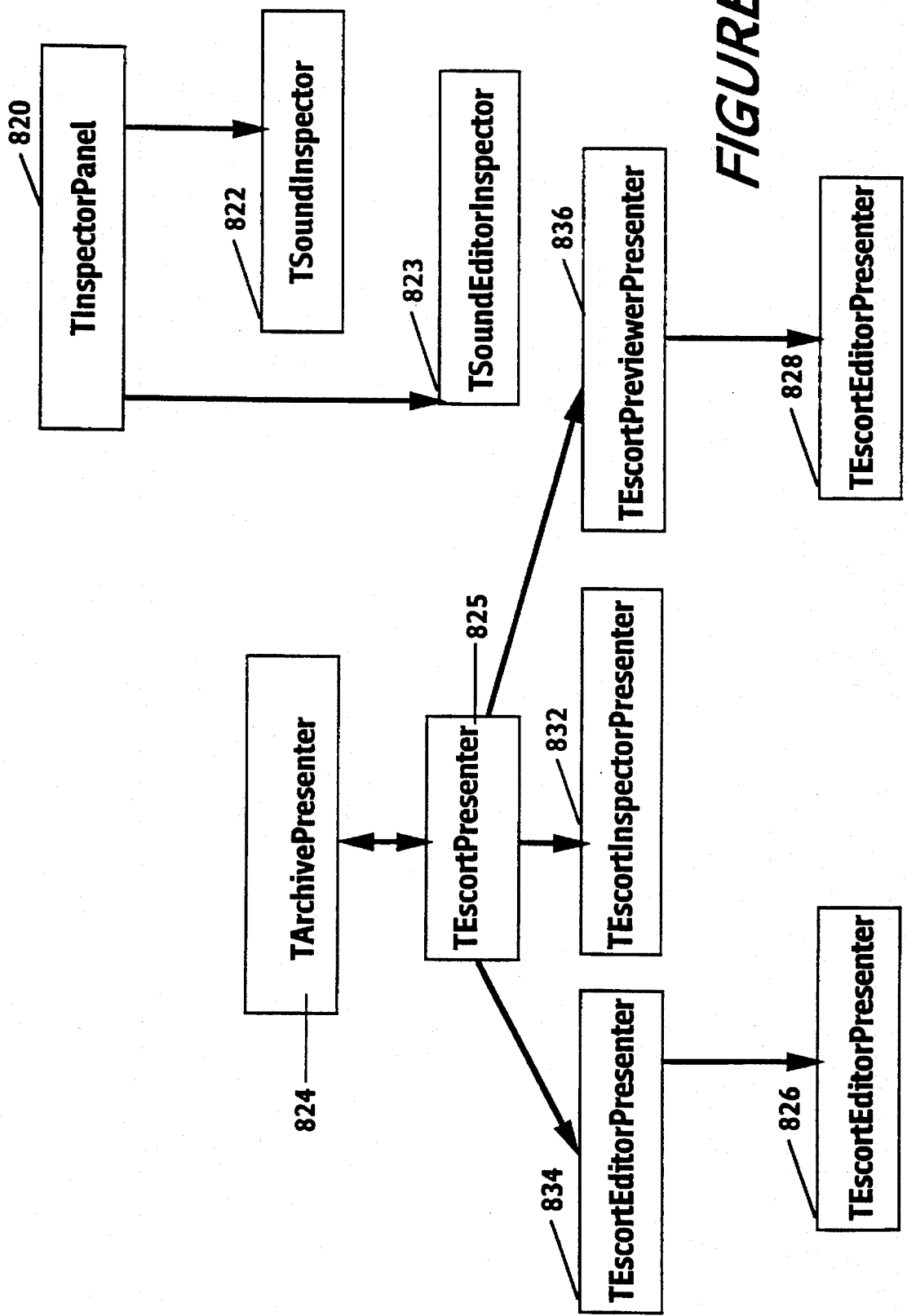

FIG. 8 is stylized class diagram which indicates the main classes used by the constructor program to view, create and edit objects and their associated escort objects. Three base classes are provided that allow the constructor program to view and edit the contents of an archive. The first of these classes is the TArchiveView class 802 which provides a graphical view of the contents of an archive model. In particular, there may be several alternative ways of viewing the UI object data that is included in the archive. One archive view appears as a locale tree diagram similar to that shown in FIG. 3A. However, there are also alternative views which have the same graphical appearance, but may include, for example, a view by object name, a view by object type, a view by locale or a view by creation or modification date etc. These alternative views of the archive data are managed by the TArchiveView class. The TLocaleViewer provides a "cataloging" view by type of the objects in an archive.

Figure 9:
FIG. 9 is the screen display of a presentation editor illustrating the manipulation of the components that comprise the presentation.
Figure 9:
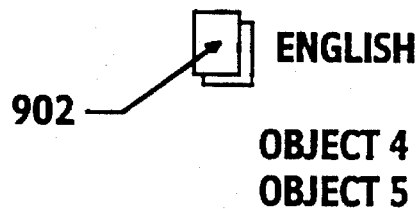
Figure 9:
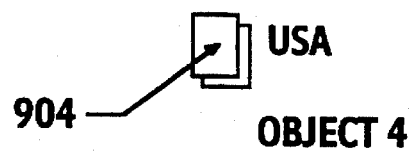
Figure 9:
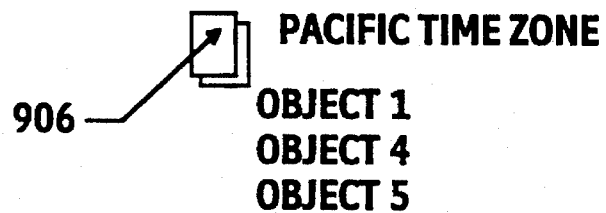
Figure 9:
Figure 9:
Figure 9:
Figure 9:

An additional archive view is called a presentation view and appears as a list of archive locale levels as shown in FIG. 9. The listed locale levels comprise the root locale 900, the English locale 902, the USA locale 904 and the Pacific Time Zone locale 906. Other locales may be present but are not shown. Objects included in each locale level are listed.

Figure 10:
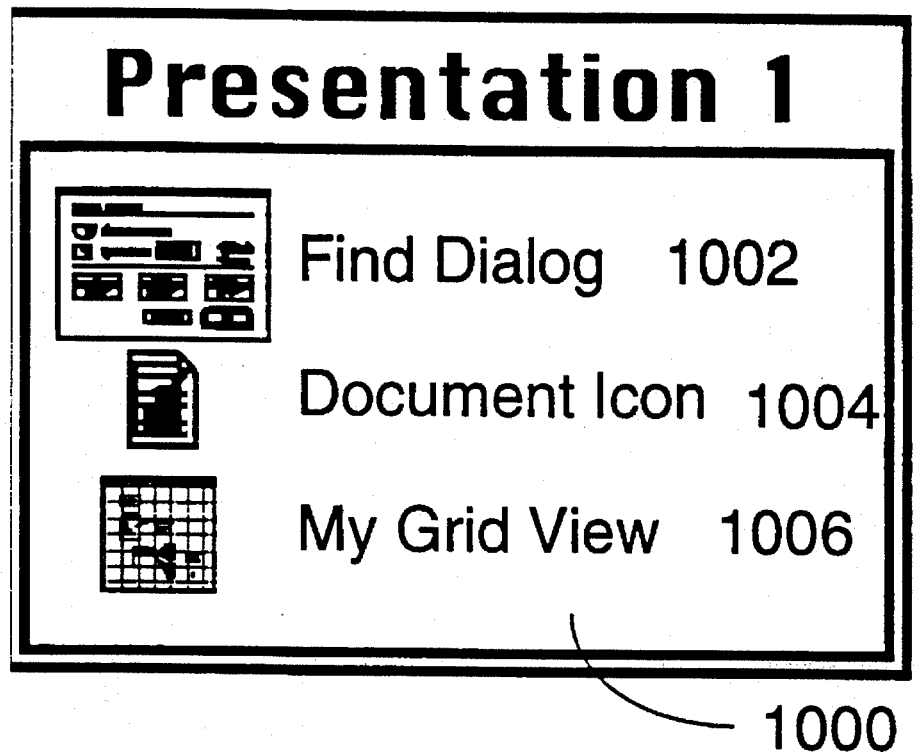
FIG. 10 shows an illustrative screen display of an inspector used to inspect an User Interface (UI) object.

The archive views and presentations generated by the TArchiveTreeViewer and TLocaleViewer object only let a developer view the contents of an archive. In order to view or modify an archived object, another mechanism must be used. Two mechanisms are provided for modifying archived objects: editors and inspectors. An editor generates an editable screen display of an archived object. In some cases, the editor display may look similar to the archive presentation display. This is especially true for archived objects that contain other archived objects. For example, a type of object known as a presentation object, for example, contains other user interface objects that make up the presentation. Therefore, a presentation editor would generate a display that allowed a user to see and manipulate the objects contained in the presentation as illustrated in FIG. 10. In FIG. 10, presentation editor 1000 displays three icons: a dialog icon 1002, a document icon 1004 and a view icon 1006. The editor 1000 allows the three components represented by the icons to be added or deleted from the presentation.

Figure 11:
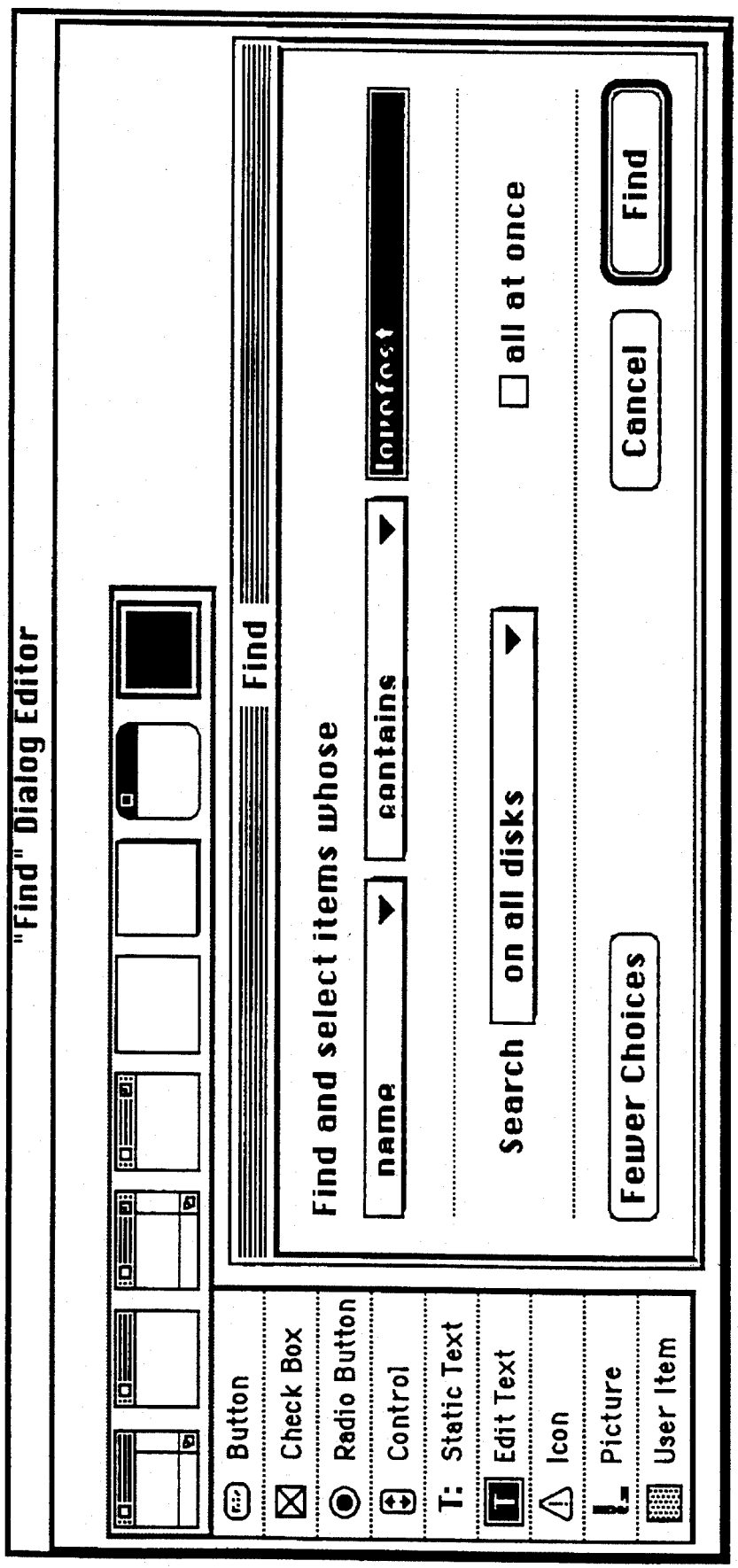
FIG. 11 shows a screen display generated by a UI object editor.

In addition, to the presentation editor described above, additional object editors will be provided which are direct manipulation editors. Editors may also be nested. For example, a user could select the "Find Dialog" item in FIG. 10 and open another editor; a dialog editor (which generates the display as shown in FIG. 11) to edit the "Find Dialog" item. A preferred embodiment of the subject invention provides support for View Editor functions including views, windows and dialogs like that described above. A menu editor is also provided with support for inspectors which generate menu items, graphics, views, labels, sliders, text controls, push buttons, scrolling views, text items, check boxes and radio buttons.

Another mechanism for editing objects in the constructor program is called an inspector. An inspector appears like a modeless dialog box or control panel which contains a list of an archived objects attributes and variables. The list is arranged so that the attributes and variables can be edited, but the object's screen display does not appear on the screen during the editing procedure. Inspectors are used because some attributes of an object are more easily manipulated through a "dialog box type" interface than by direct manipulation. An inspector may hierarchically display the internal construction of a UI object at each level of the class hierarchy. The developer can show or hide the portion of the inspector that deals with each level in the class hierarchy. This hierarchical approach to inspectors allows the constructor program to assemble inspectors on the fly. Moreover, the creator of a new constructible class only has to build the portion of an inspector that deals with his class.

Two additional base classes denoted as TInspector 804 and TObjectView 806 are also provided to create the editors and inspectors. The TInspector class provides a dialog box style interface for displaying and editing the UI object attributes. The TObjectEditor class 806 provides a direct manipulation editor for changing objects in an archive.

As previously mentioned, the UI object actual screen display is not manipulated by the editor object, but instead a "stand-in" display which looks like the UI objects screen display is edited. The TGraphiculator class 812 is used to instantiate objects which provide the graphical appearance for the archived UI objects as they appear in a direct manipulation editor created by the TObjectEditor class 806. The TGraphiculator class contains member functions for moving, sizing and dragging the generated screen display. These member functions are called by the editor during the editing process. The TGraphiculator class also contains the important member function Draw( ) which is called whenever the graphiculator's appearance needs to be redrawn. In general, the Draw( ) method of a TGraphiculator object is implemented by calling the Draw( ) method of the associated escort object which, in turn, calls the Draw( ) method of the escorted object.

INSPECTOR AND EDITOR INTERNALS

Inspectors

An inspector is created from a TEscortInspectorPresenter 832 which is a Presentation Framework subclass. A user initiates some action (double-click an escort, or a menu command) to open an inspector on an object. TEscortInspectorPresenter is told to create a main view. This routine creates a new TInspector, passing it the escort to inspect. Then the TEscortInspectorPresenter creates an empty deque of TInspectorPanels and passes that deque to the escort's BuildInspectorPanelList function. The escort's BuildInspectorPanelList function creates an TInspectorPanel and adds it to the deque and then calls its base class BuildInspectorPanelList function. In this manner, a deque of inspector panels is created from most specific down to most generic for any given escort. The panels, each individually collapsible, are organized in a vertical fashion in a window.

Each inspector panel has controls to modify attributes of the escorted object. The inspector panels are actually built with Constructor and read on-the-fly from an archive. Clicking on controls in the inspector sends actions to the inspector. The action is caught, the changed control interrogated, and the appropriate function in the escort is called. The escort changes the actual value in the object and sends out notification. Other inspectors and editors looking at the same escort or object are notified and update their state and visual display accordingly.

Editors

An editor is created from a TEscortEditorPresenter 834. Every escort that supports a graphical editor must subclass TEscortEditorPresenter to override the HandleCreateMainView function. HandleCreateMainView is responsible for creating the appropriate editor and returning it to the presentation framework. TViewEditorPresenter, for example, creates a TViewEditorCanvas for editing views, dialogs, and windows.

Viewers

Viewers are used to look and play with a live copy of the object being edited. Previewers are created from the TEscortPreviewerPresenter 836 class and its subclasses. A preview of an escort is made by asking the escort to return a real copy of the object it is escorting. The object is placed in a content view inside of a window and displayed on the screen. An optional Action Debugger window is displayed. The action debugger catches actions sent from UI elements in the previewer window. That way, users can see if the actions they assigned to UI elements are actually working.

Dynamic and Pluggable Viewer Instantiation

Constructor supports a number of different viewers for editing, examining, and previewing the objects created with Constructor. Unlike other similar programs that have a fixed number of viewers, Constructor has a dynamic and pluggable viewer framework for associating viewers with objects. This dynamic instantiate-on-the-fly viewer framework gives Constructor extra flexibility and expandability. Constructor can be extended to handle new objects simply by editing a single file. Different viewers can be replaced in a similar fashion.

Constructor supports three types of viewers for any given object (UI object, sound, etc.): inspector, editor, and previewer. An inspector is a viewer that allows a user to see and modify the attributes of an object (i.e. color, size, label, etc.). An inspector has a dialog-type interface. An editor is a viewer that allows WYSIWYG direct manipulation editing of an object. Instead of typing in the bounds of a button, for example, resize the button by dragging the corner of a button that you can see on the screen. To change the color of an object in an editor viewer, you simply drag a color and drop it on the object. A previewer is a viewer for examining an actual instance of an object. For example, Constructor has a dialog editor for putting together a dialog. If a user wants to "try out" the dialog before using it in a program, he can open a previewer on the dialog. The previewer will create an instantiation of the dialog and allow the user to push the buttons, click on controls, etc.

Other UI builders support variants of these viewers. What makes Constructor unique, however, is the fact that the viewers are not hardwired to any associated UI object. For example, Constructor currently supports an editor, inspector, and previewer for menus. Our system lets a programmer write a better menu editor and install it in Constructor without changing a line of Constructor's code. Constructor uses an associated "schema" file that maps objects to editors. For any given base UI object that Constructor supports, the schema file has an entry for each editor, inspector, and previewer that contains the name of the class and the name of the shared library. When ever Constructor has to open a viewer on an object, it consults this file and dynamically instantiates the correct viewer for the object. This table-driven scheme allows easy replacement of any viewer for any object. A sample file in accordance with a preferred embodiment is presented below.

```

# Each escort has 15 associated items:

# English-style object name
# Name root used to look up objects, e.g. icons, in Constructor's
archive.
# ClassName
# SharedLibOfClassName - put VOID if you want the escort
to create the
# object, otherwise, Constructor will create the
# the object with the object's empty constructor and have
the escort adopt it.
# EscortType
# SharedLibOfEscortType
# EscortModelType
# SharedLibOfEscortModelType
# EscortEditorPresenterType
# SharedLibOfEscortEditorPresenterTypeII
# EscortInspectorPresenterType
# SharedLibOfEscortInspectorPresenterType
# EscortPreviewerPresenterType
# SharedLibOfEscortPreviewerPresenterType
# BaseClassEditor

"View"
View
TView
VOID
TViewEscort
ViewPlugInConstructorLib
TViewEscortModel
ViewPlugInConstructorLib
TViewEditorPresenter
ViewPlugInHighLib
TEscortInspectorPresenter
ConstructorLib
TViewEditorPreviewerPresenter
ViewPlugInConstructorLib
TView
"Text"
Text
TText
VOID
TTextEscort
TextPlugInConstructorLib
TEscortModel
ConstructorLib
TEscortEditorPresenter
ConstructorLib
TEscortInspectorPresenter
ConstructorLib
TViewEditorPreviewerPresenter
ViewPlugInConstructorLib
TText
```

Figure 33:
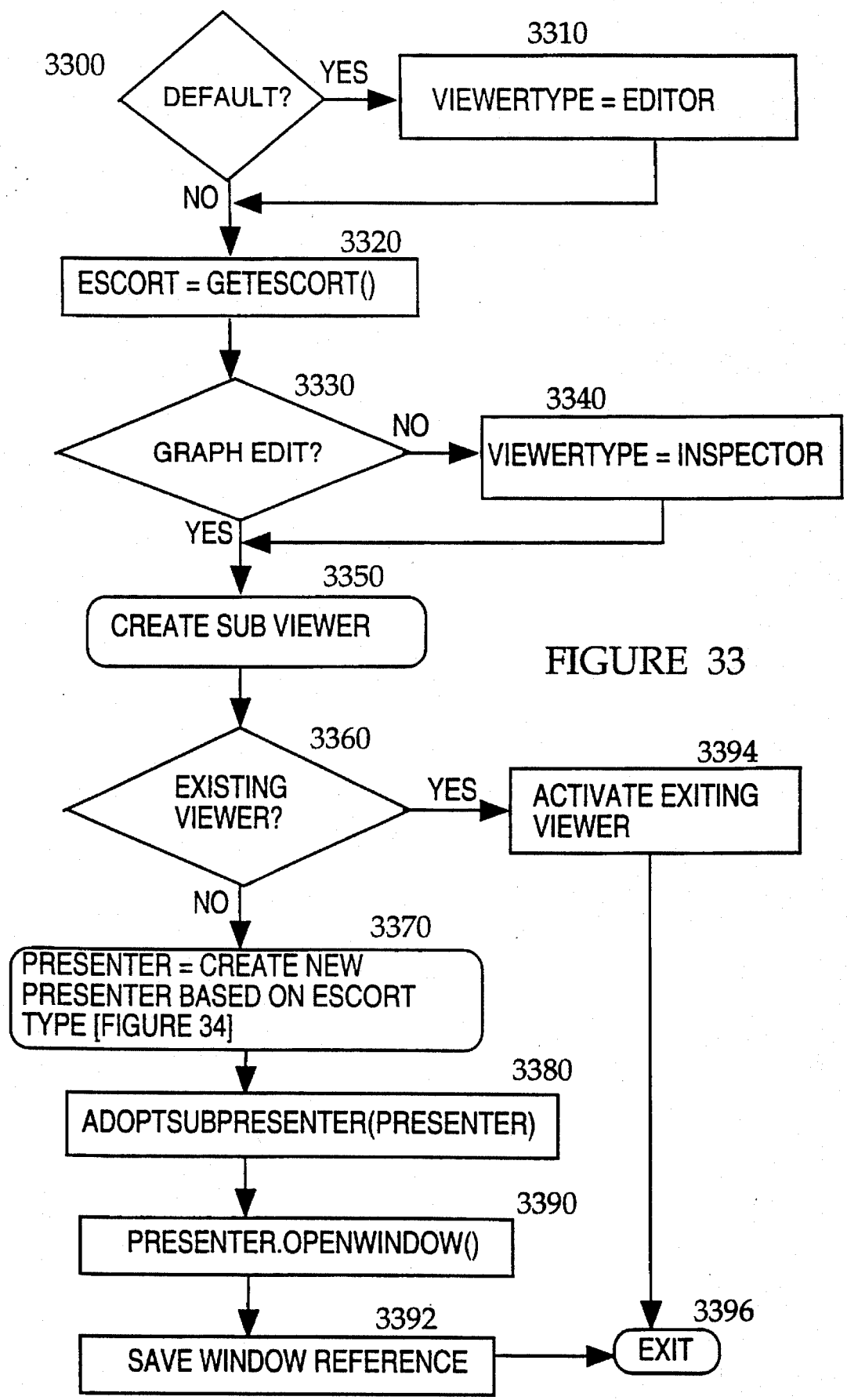
FIGS. 33–35 are flowcharts setting forth the detailed logic of a pluggable viewer in accordance with a preferred embodiment.

The detailed logic associated with a pluggable viewer in accordance with a preferred embodiment is presented in FIG. 33. Processing commences at decision block 3300 where a test is performed to determine if a default pluggable viewer is required. If so, then the viewertype is set equal to editor as shown in function block 3310 and control passes to function block 3320. If the default viewer is not required, then control passes directly to function block 3320 where an escort object is instantiated. Then, a test is performed at decision block 3330 to determine if a graph edit view is required. If not, then the viewer type is defined to be an inspector and control passes to terminal 3350 where a sub viewer is created. Then a test is performed at decision block 3360 to determine if there is already an existing viewer of the appropriate type. If so, then at function block 3394 the existing viewer is activated and control exits through terminal 3396. If there is no existing viewer detected at decision block 3360, then control passes to function block 3370 to create a new presenter based on the escort type, a subpresenter is adopted in function block 3380, a presenter is opened in function block 3390, the window reference is saved for later processing, and control exits via terminal 3396.

Figure 34:
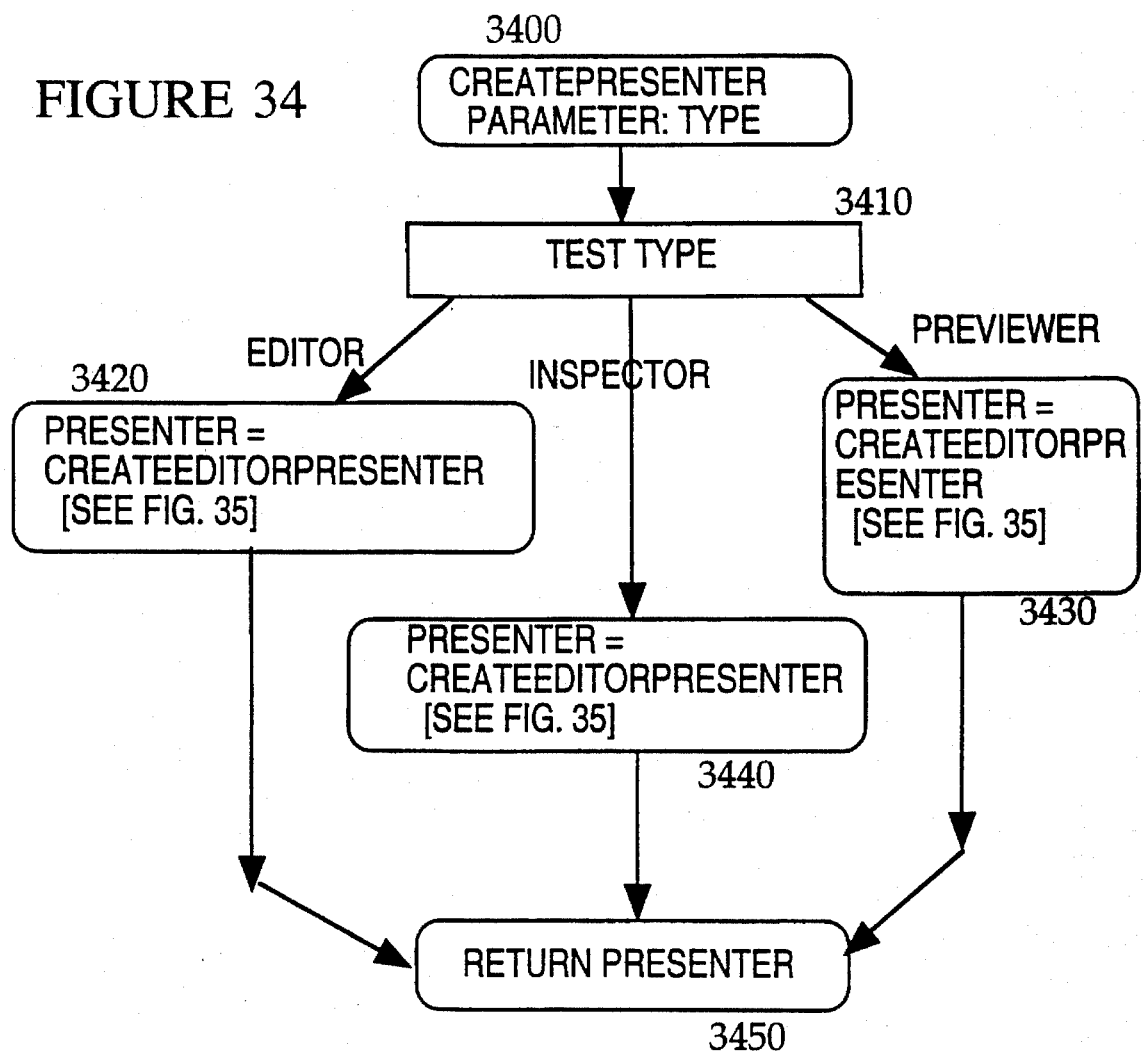

FIG. 34 is a detailed flowchart of the logic associated with creating various presenters in accordance with a preferred embodiment. Processing commences when a create presenter command is encountered at terminal 3400 and immediately passes to a test to determine if an editor is to be created, in which case, control passes via function block 3420 to FIG. 35 to create an editor presenter, and control is returned via terminal 3450. If an inspector is to be created, then control is passed to function block 3440 to create an editor presenter, then control is returned via terminal 3450. If a previewer presenter is required, then control is passed to function block 3430 to service the request and return control via terminal 3450.

Figure 35:
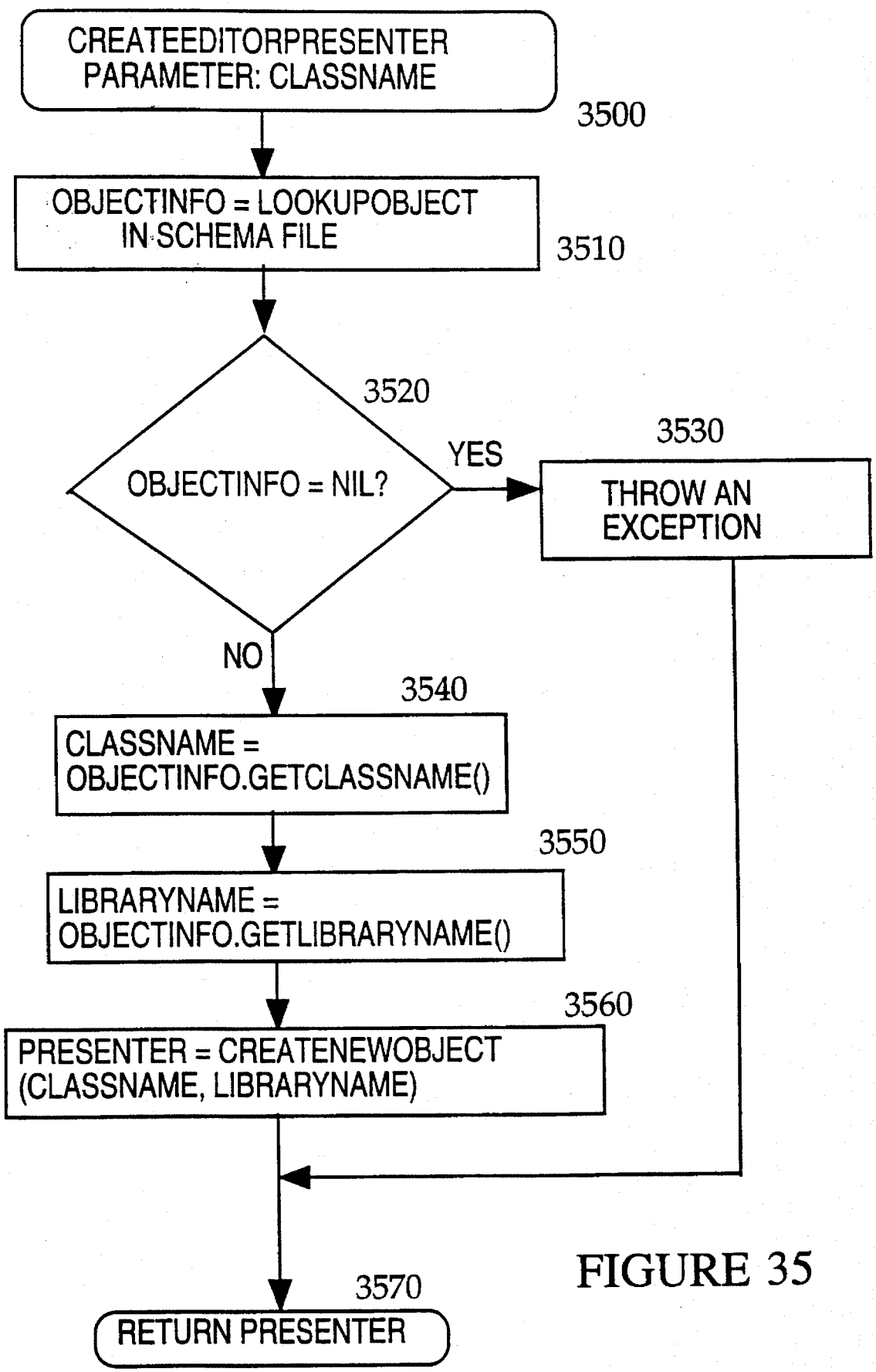

FIG. 35 is a detailed flowchart of the logic associated with creating a presenter for editing in accordance with a preferred embodiment. Processing commences at terminal 3500 and immediately the object passed via the classname is identified in the schema file as shown in function block 3510. Then, a test is performed at decision block 3520 to determine if the object information is equal to nil. If so, then an exception is thrown at function block 3530, and control is returned via terminal 3570. If the object information is not nil, then the classname is initialized at function block 3540, the libraryname is initialized at function block 3550, and a presenter is instantiated based on the classname and the libraryname as shown in function block 3560 and control is returned via terminal 3570.

Interfacing a New UI Object with the Constructor Program

Constructor can support any new UI object, based on TView, without having to modify Constructor at all. Since all UI elements descend from TView and Constructor can handle any TView object that obeys a few simple rules, Constructor can handle new UI objects by default. Every inspector in Constructor has a panel at the very bottom called "Information." The information panel contains modification and creation dates and two text fields for entering a class and library name. If a developer creates a new UI element, it can be immediate used by creating a TView object and updating these two text fields by typing in the class name of the new UI element and the name of the shared library that implements the class. At that point, Constructor will convert the escorted TView object into the new UI element. The only disadvantage of this approach is that new attributes of the UI element cannot be modified by the TView inspector. If a developer wants to create an inspector that allows the user to modify the state of the UI element (check some field, name some label, etc.), he will have to subclass Constructor classes, create an escort, and build a custom inspector.

Depending upon the class of the object the user creates and wants to use in Constructor, he may or may not have to write a custom editor. A new UI element, for example, won't require the user to write an editor since Constructor already provides a view editor that can manipulate any view object.

Constructor supports the editing of views and any of their subclasses, menus, and text. For example, suppose a developer wanted Constructor to fully support the editing and inspecting of sounds, there are several classes that he'd have to override. First of all, the developer would create a subclassed object escort: TGraphicalEscortFor<TSound>824. The developer would use Constructor to design and layout an inspector for manipulating sounds. He'd create an inspector panel subclass called TSoundInspector 822. The developer would override TSoundEscort's BuildInspectorPanelList function to add the TSoundEditorInspector 823 the panel list. Two new presenter classes would be also have to be created. TSoundEditorPresenter 826 would be the presenter that created the actual sound editor. TSoundPreviewerPresenter 836 would be the presenter that might play the sound when the user previews what he's edited.

Interfacing a New UI Object with the Constructor Program

In order to create a new UI object which is compatible with the constructor program, it is necessary to subclass some of the base classes illustrated in FIG. 8. In particular, the TInspector 804 and TObjectView 806 base classes and the TGraphiculator helper class must be subclassed with the member functions overridden so that the new object can be edited. However, the new object must also have a new escort class created. This new escort class is created by subclassing the base escort classes provided in the constructor program.

More specifically, the starting escort class is the TAbstractEscort class 800 which is an abstract base class that contains protocol common to all escort objects. In particular, class 800 contains a member function, GetArchive( ), which can be used to locate an archive that contains the given escort object. When the GetArchive( ) method is called it causes the archive to search each level until the given escort object is found.

Descending from the TAbstractEscort class is the TObjectEscort class 808. As previously mentioned escort objects enclose the actual UI objects and provide, among other things: a unique ID for selectability, a common protocol across all the objects, a storage location for basic data associated with the enclosed object (such as the name, icon, class and modification data etc.) and access to editor programs which can be used to edit the object. The TObjectEscort class also includes a number of "getter" and "setter" member functions which allow the stored information about the enclosed object to be obtained including the name, the locale, the escorted object class name, the escorted object shared library, the version, various descriptions, and the creation and modification dates. The escorted instance of the escorted object can be accessed via a GetEscortedObject( ) member function. Additional member functions are provided to create inspectors and editors that allow the escorted object to be viewed and edited, as will hereinafter be described.

The TObjectEscort class is the abstract base class from which all concrete escort object classes descend. Consequently, program developers who create new classes of UI objects and who wish to use these objects in constructor archives need to subclass the TObjectEscort class to provide access methods to match the unique protocol of the new class. Therefore, when a developer makes changes to such an new object using an editor, the editor calls the methods of the associated escort object to manipulate the "real" object. For example, if the user changes the size of a button in an editor, the editor will cause the escort object to resize itself; the escort object will, in turn, tell the real object to resize itself.

Another abstract base class, the TGraphicalObjectEscort class, 812 descends from the TObjectEscort base class. The TGraphicalObjectEscort class is the base class from which escorts for graphical objects descend. These objects might include, for example, scrollbars, buttons and other graphical objects. In addition to the protocol inherited from the base class TObjectEscort, the TGraphicalObjectEscort class supports direct manipulation graphical editors which allow a developer to view the object while it is being edited. The TGraphicalObjectEscort class contains a number of member functions including a Draw( ) function which is called to the cause the escorted object to draw itself onto the screen. Typically, the Draw( ) function is executed by making a call to the corresponding "draw" function of the escorted object causing the escorted object to draw itself on the screen (this latter "draw" function has been previously described with respect to UI objects.) Another member function in the TGraphicalObjectEscortObject is a CreateEditor( ) member function which creates an editor program that can be used to directly manipulate the archived object.

Still another member function is the UseSubObjectEditor( ) member function. This method controls whether or not subobjects are edited using their own direct manipulation editors or whether an inspector should be used. For example, the subobjects of a TViewObject are subviews which, because of their relationship in the view hierarchy, can only be changed by an inspector. The subobjects of a presentation object however include menus, palettes, views and windows and these can be edited separately with a direct manipulation editor.

The remaining two member functions are the InitGraphiculator( ) function and the AdoptGraphiculator( ) function. These functions generate a screen display. As previously mentioned, editors and inspectors do not actually manipulate the screen displays created by the escorted objects, but instead manipulate screen objects which look like the screen displays of the escorted object. The InitGraphiculator( ) and AdoptGraphiculator( ) member functions create and associate a "graphiculator" object with a particular escort object. The graphiculator object, in turn, creates the screen display that is manipulated by the editor.

As shown in FIG. 8, if a newly-created object must be compatible with the constructor program, then a new escort object class must also be created. As shown schematically by box 814, this new escort class has the same basic member functions as the TGraphicalObjectEscort class. These member functions include the Draw( ) function, the CreateEditor( ) function, the UseSubObjectEditor( ) function and InitGraphiculator( ) and AdoptGraphiculator( ) functions as previously described.

Constructing an Archive File

Figure 12:
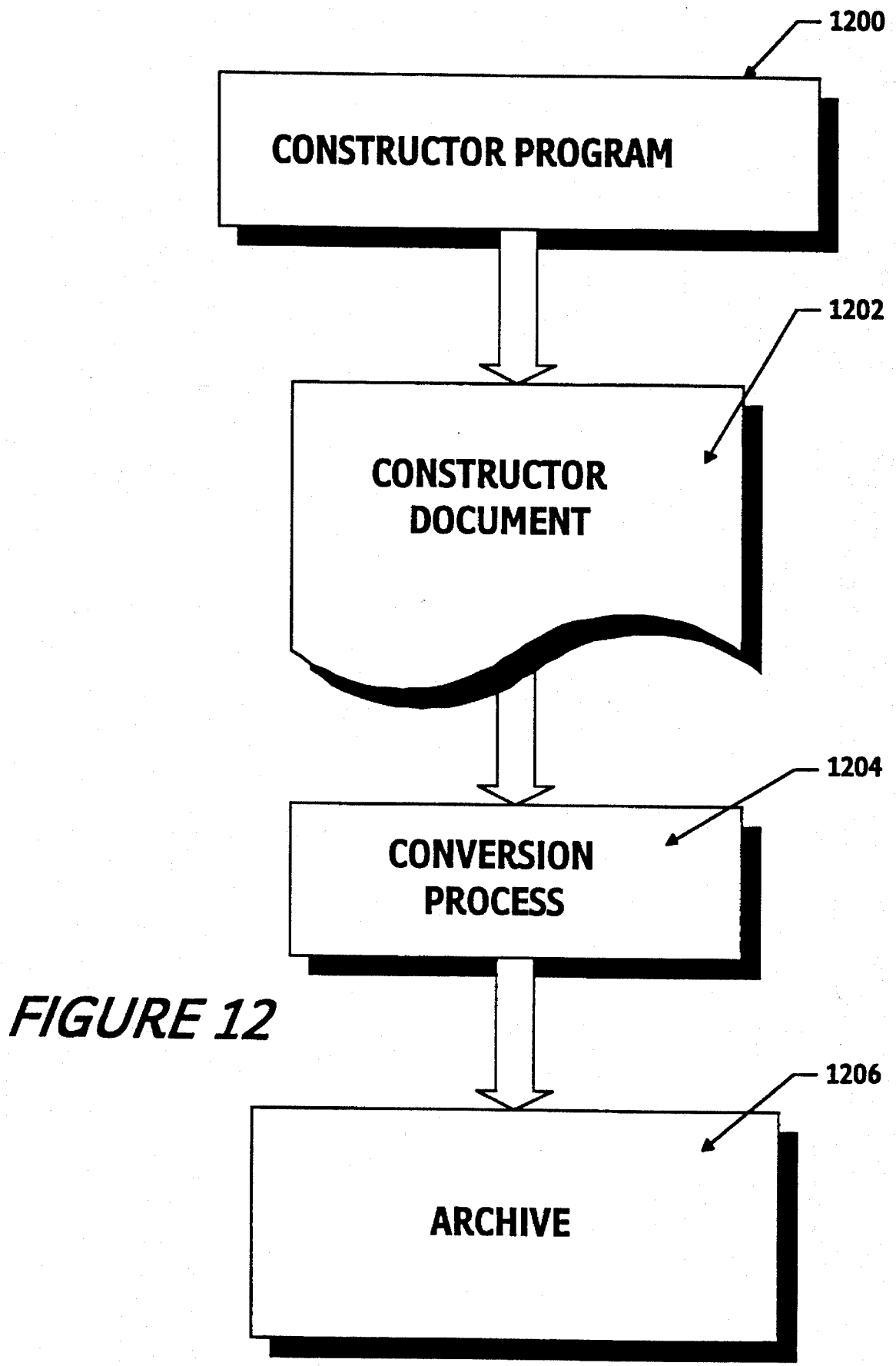
FIG. 12A is a stylized block diagram illustrating the steps involved in creating a new archive using the constructor program.

An archive is actually constructed utilizing the constructor program to construct an intermediate constructor document which contains UI object data as discussed above. This document is then converted by a conversion or "extrusion" process to produce a binary archive file. This process is illustrated in the schematic flowchart shown in FIG. 12. In particular, the constructor program shown as box 1200 generates UI object data which is stored in a constructor document 1202. Document 1202 is a standard document which can be edited, cut and pasted etc. After construction of document 1202 is complete, it is converted via a conversion process 1204 known as "extrusion" process which saves the document as a binary file which constitutes the archive file 1206.

Extrusion or Saving an Archive

The function SaveArchive in TArchiveModel is the main routine that saves the contents of the Constructor document into an archive. After prompting the user for an archive name, a writeable archive is created. Then, an archive model iterator is created. Using the iterator, every escort model is extracted from the archive model. Each escort model executes the command "CommitModelToArchive." The CommitModelToArchive function of an escort model gets the escort from the escort model and asks the escort to "CreateArchiveReadyObject". CreateArchiveReadyObject returns a copy of the escorted object. The escorted objects are passed to a TArchiveEnvelope and written directly to the archive.

View Editor: Showing Clipped View Hierarchies

Figure 13:
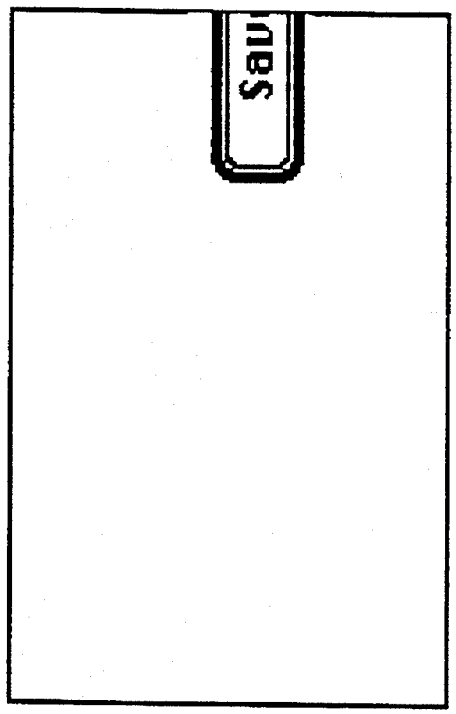
FIG. 13 is a display of a clipped control.

Constructor's view editor is used for assembling view hierarchies and dialog panels. In Taligent's view system, subviews are clipped to their parent view. For example, if a button is centered on the right border of a view so that it is halfway in the view and halfway outside, only the half of the button inside the view will be visible as shown in FIG. 13.

Although clipping is essential for a production view system, it can cause confusion for a user during dialog creation in a direct manipulation user interface builder program. A user interface builder program allows a user to graphically design windows, dialogs, and view hierarchies. By choosing various User Interface (UI) elements from a menu or palette, a user can build a window or dialog that can be used from another program. Building a dialog with a user interface builder is much easier than programmatically building a dialog. Getting all the positions and sizes of UI objects correct from a programming point of view is very tedious. On the other hand, dragging an actual button and placing it in the correct position on the screen is very easy.

Figure 14:
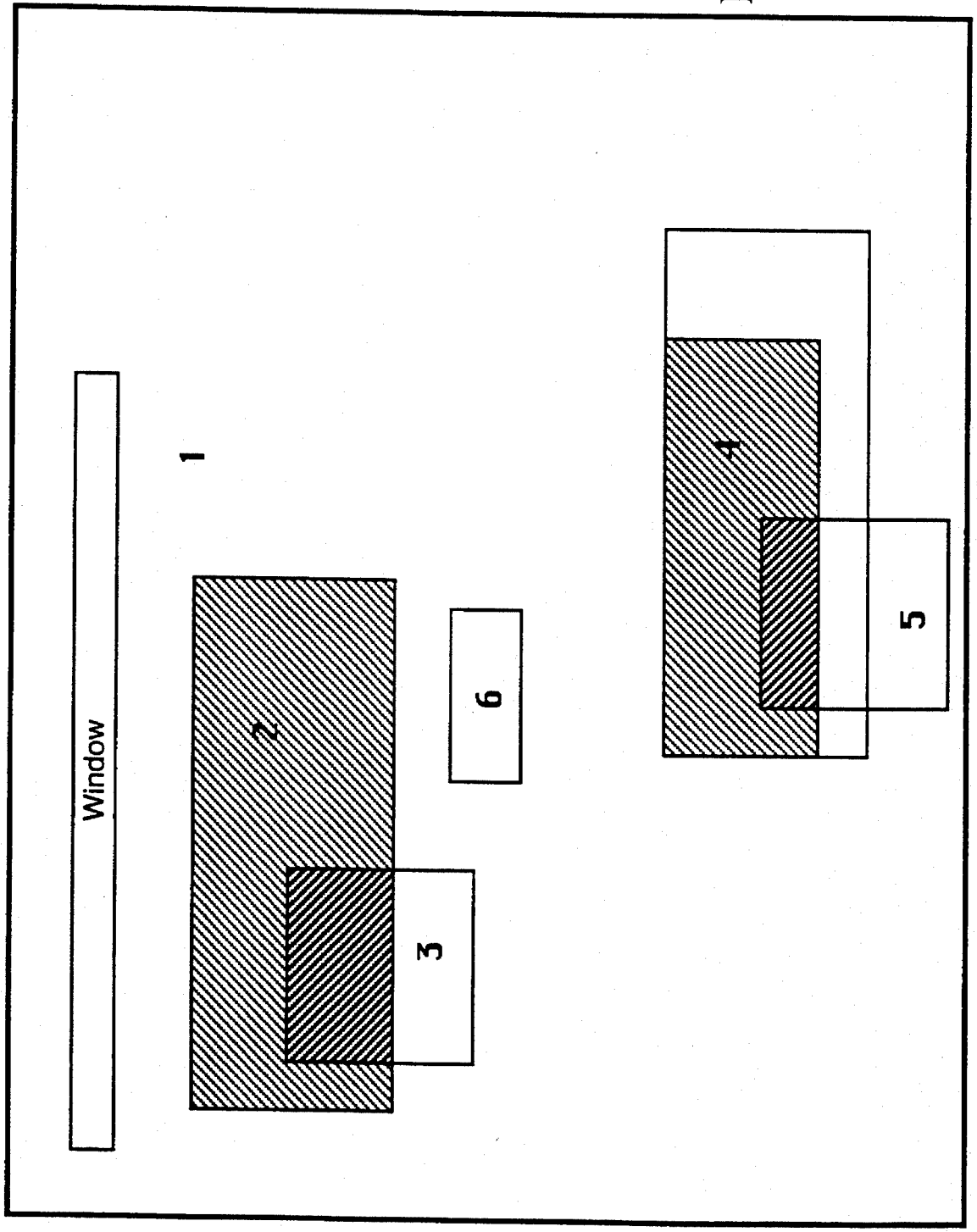
FIG. 14 is an illustration of a plurality of windows in accordance with preferred embodiment.
Figure 15:
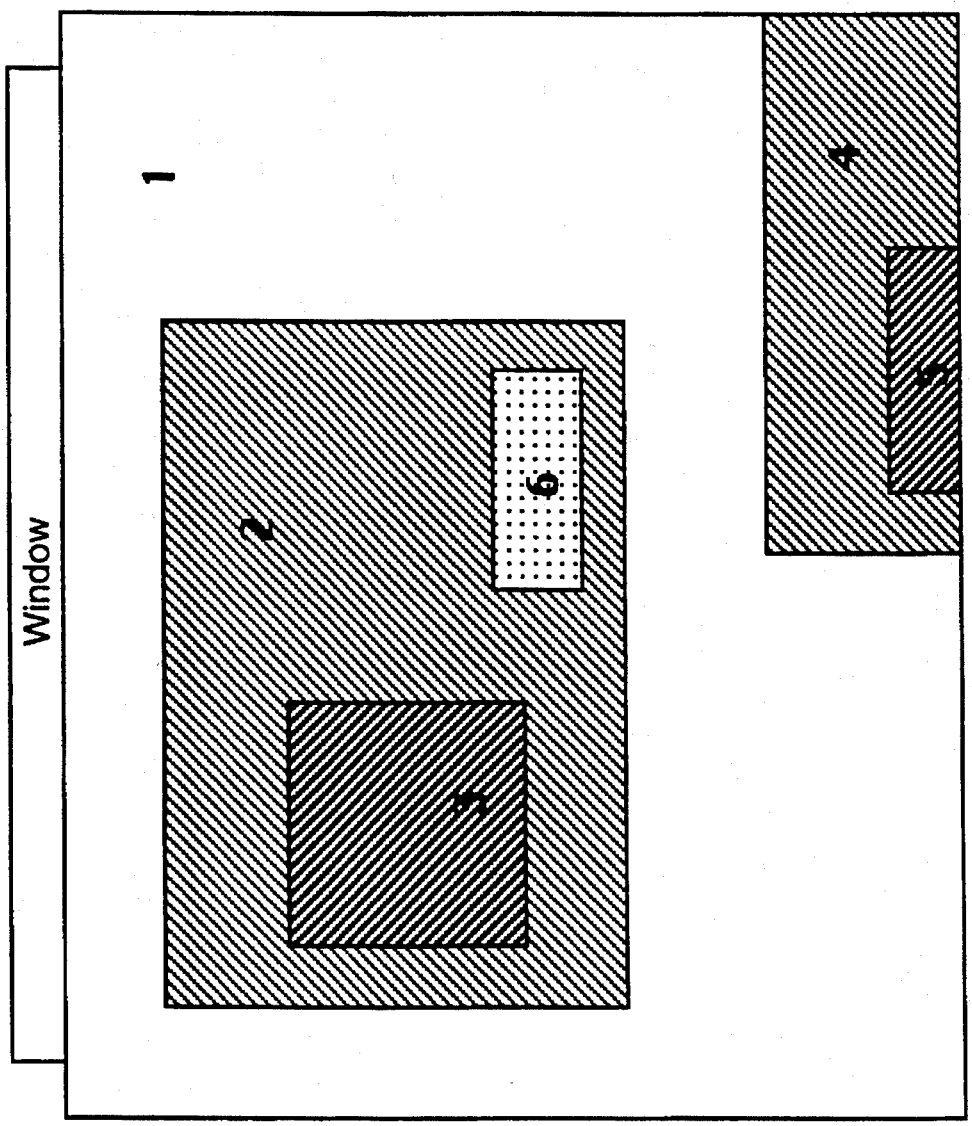
FIG. 15 is an illustration of multiple overlapping windows in accordance with a preferred embodiment.
Figure 16:
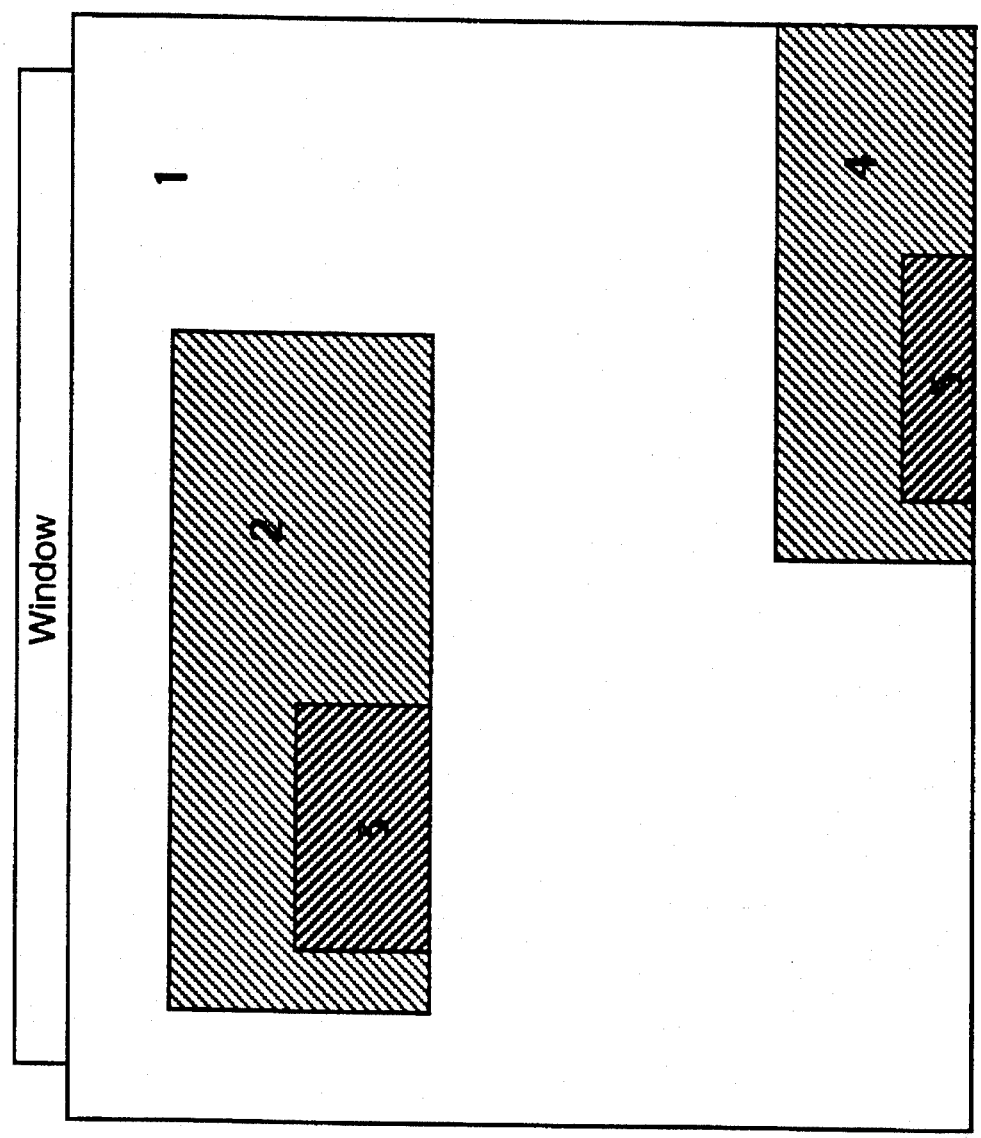
FIG. 16 is an illustration of clipping of multiple overlapping windows in accordance with a preferred embodiment.

If a user interface builder program uses the host view system to draw the UI a user is assembling, non-intuitive results can occur. Suppose, for example, that a user resizes a view that contains a button (item 6 of FIG. 15). If the view being resized no longer encloses the button, the button completely disappears as shown in FIG. 16. To prevent users from "losing" buttons (and views), a preferred embodiment of the invention shows the clipped portions of views in a dimmed fashion (instead of clipping the view). Users can move UI items out of views and dialogs, while they rearrange the contents, and not lose those items as shown in FIG. 14. On the other hand, a UI builder tool does no view clipping at all, the what-you-see-is-what-you-get benefit of the tool is lost. Another benefit of a preferred embodiment is that subviews can be made larger than their parent view and it is still possible to manipulate the subview. Other UI builders make this operation difficult.

A preferred embodiment presents views in a back-to-front order, starting with the root view.

FIGS. 31 and 32 are detailed flowcharts corresponding to the logic associated with drawing clipped and non-clipped views. Pseudo code for drawing the views is also presented below as an alternative source of logic presentation. Processing commences at terminal 3100 where the internal parameters are initialized. Then, at function block 3110, the viewbounds are initialized, at 3120 the newclip port is initialized, at function block 3130 the new combined area is calculated to include the intersection of the combined clip area and the view boundary, at function block 3140, the inverted clip area is calculated and finally, before transferring control via terminal 3200, the inverted clip port area is calculated at function block 3150.

FIG. 32 presents additional logic via a flowchart on the processing of clipped and non-clipped views in accordance with a preferred embodiment of the invention. Processing commences at function block 3210 where a loop processes each view, corresponding to each window on the display, to present each view in the correct format. The first step in the loop is to set the subviewbounds as shown in function block 3220. Then, a translated port is calculate in function block 3230, an inverted translated port is determined at function block 3240, function block 3250 draws the translated port, the port is clipped in function block 3260, and the combined area is drawn at function block 3270 before control is passed back to function block 3210 to perform the next loop iteration.

Internally, each object thinks its top left bounds are 0,0. In order to get the object to draw itself on the screen at the correct location, the program could either "translate" the object to the correct place, or simply use a translated port. GrafPorts are used as a fundamental drawing object. A TranslatedGrafPort is a grafport subclass that has an associated translation matrix. By associating a translation matrix with a grafport, an object drawn by the translated port may "think" it's being rendered at 0,0, when in reality, it's being rendered at the translated position. The view clipping algorithm uses this feature to draw all of the views in their correct positions on the screen.

---

Pseudo Code for Drawing Clipped and Non-Clipped Views

---

```
DrawViewHierarchy(GrafPort) {
    // The variable "combinedClipArea" cumulatively keeps track of
    // the clipping area. Each view drawn will be clipped to this area.
    // As the view hierarchy is traversed, the "combinedClipArea" gets
    // smaller and smaller as each subview is clipped to its parent's bounds.
    // The combinedClipArea variable starts out "wide open."
    Area combinedClipArea = infinite sized area;
    // Draw the root view with no clipping at all
    RootView->Draw(GrafPort);
    // Now draw the root view's subviews
    RootView->InternalDraw(GrafPort, GrafPort, combinedClipArea);
}
View::InternalDraw(clipPort, originalPort, combinedClipArea) {
    // InternalDraw( ) is a recursive procedure that draws a view's
    // subviews.
    // Get the bounds of this view in its parent's coordinates
```

Pseudo Code for Drawing Clipped and Non-Clipped Views

```
    viewBounds = BoundsOfThisView( );
    // "newClipPort" is a GrafPort that clips any drawing to my parent's
    // bounds intersected with this view's bounds.
    newClipPort = cumulative clipping GrafPort made
            up of clipPort and viewBounds;
    // "newCombinedClipArea" is an area of my parent's drawing bounds
    // intersected with this view's bounds.
    newCombinedClipArea = intersection of combinedClipArea and viewBounds;
    // "invertedClipArea" is an infinitely sized area minus the area that
    // this subview can draw in. In other words, it's the area that
    // will normally get clipped.
    invertedClipArea = infinite sized area subtracting newCombinedClipArea;
    invertedClipPort = clipping GrafPort based on invertedClipArea;
    for each subView in this view {
        subviewBounds = BoundsOfSubview( );
        translatedPort = newClipPort translated by the top/left coordinates of
            subviewBounds;
        invertedTranslatedPort = invertedClipPort translated by the top/left
            coordinates of subviewBounds;
        // Draw the subview normally. Any parts of the subview extending
        // outside of the translatedPort will be clipped.
        subview->Draw(translatedPort);
        // Now tell the subview to draw the clipped portion of itself.
        // Now parts of the subview that are normally clipped will get
        // drawn and parts that normally get drawn will get clipped.
        subview->DrawClipped(invertedTranslatedPort);
        // Recursively tell the subview to draw all of its subviews.
        subview->InternalDraw(newClipPort, originalPort,
newCombinedClipArea);
    }
}
View::Draw(GrafPort) {
    Draws the view normally
}
View::DrawClipped(GrafPort) {
        bounds = BoundsOfView( );
        Draw the bounds using GrafPort and a light gray color;
}
```

User-Extensible Parts Palette

Figure 17A:
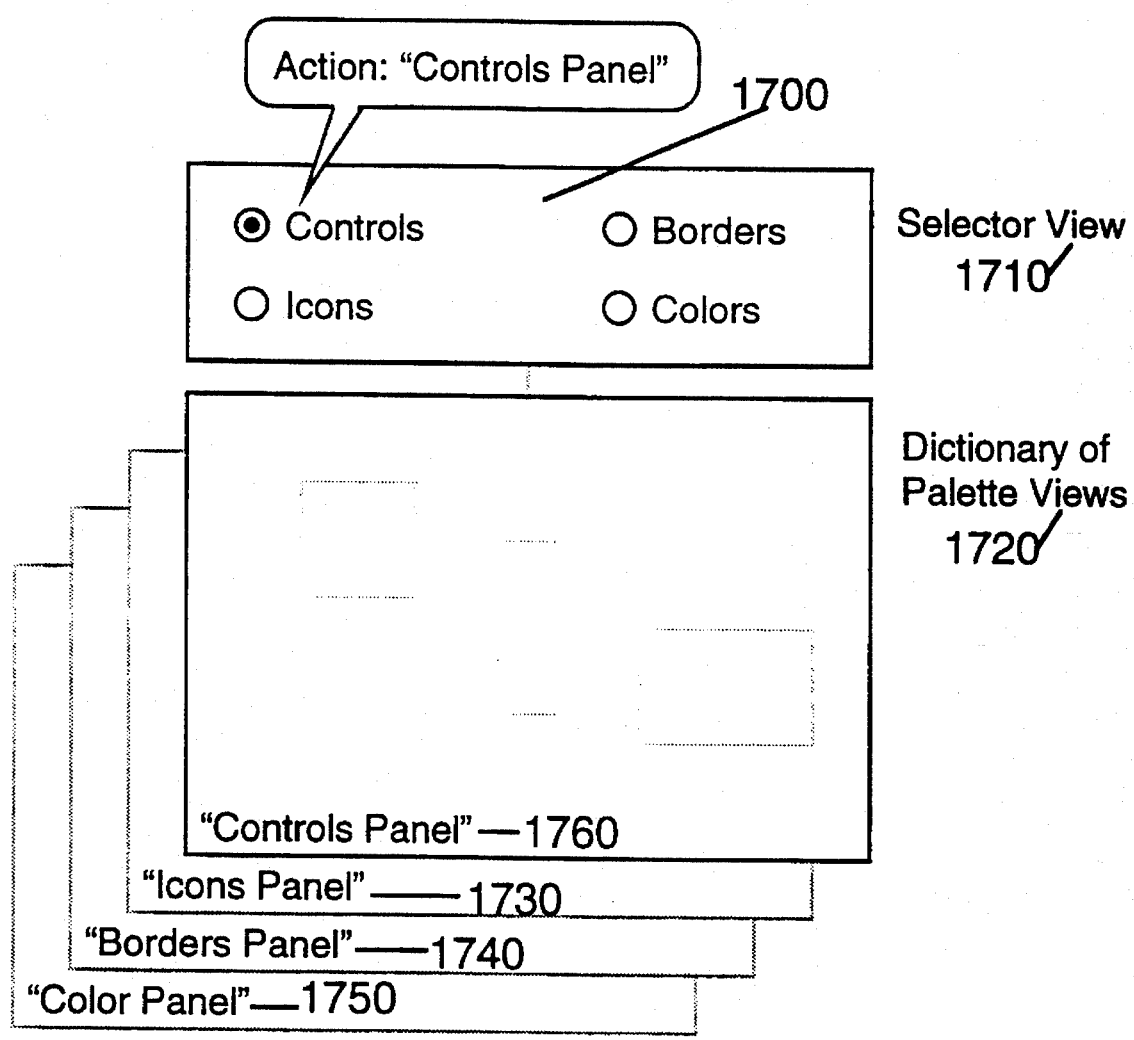
FIGS. 17A and 17B are an illustration of a parts palette in accordance with a preferred embodiment of the invention and a flowchart of the detailed logic associated with parts palette processing in accordance with a preferred embodiment.

Constructor utilizes a parts palette containing reusable controls and other UI elements that a user can drag and drop into a document. Furthermore, the palette is built utilizing tools in accordance with a preferred embodiment. Thus, a user can open the palette document and edit it to add custom UI elements. This feature provides a quick way to build a collection of views, dialogs, controls, etc. and utilize them in preparing new applications. FIG. 17A is an illustration of a parts palette in accordance with a preferred embodiment of the invention. An action control panel is presented at 1700 with various selector views 1710. A dictionary of palette views is presented at 1720, including a Control Panel 1760, Icons Panel 1730, Borders Panel 1740 and Color Panel 1750. Any of the palette views can be activated by selecting the corresponding selector view 1710 from the Controls Panel 1700. A TPaletteView—Control Panel 1760 contains subviews 1710 that correspond to each of the controls provided by the system—a push button, a check box, etc. Similarly, there is a view containing icons named "Icon Panel" 1730, and a view containing borders and decorations named "Border Palette" 1740. The fourth view is a TSelectorView named "Selector" containing 3 radio buttons; a button labeled "Controls" that sends the action "Control Panel" 1700; a button labeled "Icons" that sends "Icon Panel" 1730; and a button labeled "Borders" that sends "Border Palette" 1740. The four views live in an archive named PaletteArchive. When the palette is launched, it looks for a view named Selector in the PaletteArchive, and initializes and displays it. Control from that point proceeds as shown in FIG. 17B.

Figure 17B:
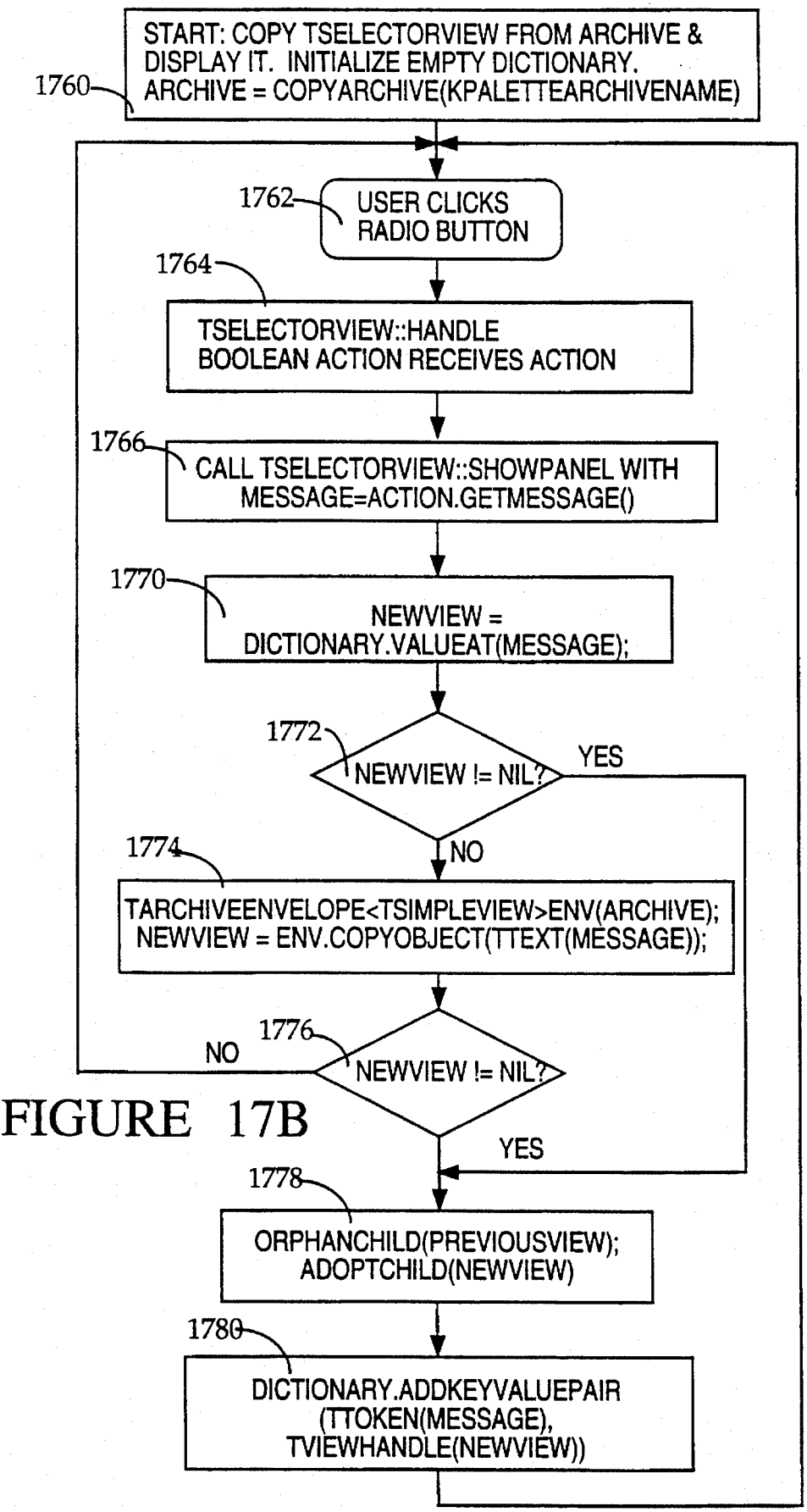

Processing commences in FIG. 17B at terminal 1760 where a selectorview object is copied from an archive and displayed on the display. Then, at terminal 1762, in response to a user pressing a radio button, control is passed to a selector view as shown in function block 1764, a call is placed to display the panel associated with the radio button as shown in function block 1766, a flag is set with the corresponding new view identifier as shown in function block 1770, a test is performed at decision block 1772 to determine if the flag is equated to the nil value. If the flag is not nil, then control passes to function block 1778. However, if the flag is nil, then the archive is updated with the new view fetched from the archive as shown in function block 1774 and another test is performed at decision block 1776 to determine if the updated flag is set equal to the nil value. If the flag is nil, then control passes to terminal 1762 to await the next radio button selection. If the flag is not nil, then the previous view and new view are adopted as shown in function block 1778, the dictionary is updated in function block 1780 and control is passed to terminal 1762 to await the next radio button selection.

The palette architecture consists of an archive and two important view classes. Each panel of the palette is a TControlsPaletteView, which contains controls as subviews. Using Constructor a user can open the view and edit the contents and layout of the controls. (Note that any view subclass may be placed on the panel by entering its name and shared library into a generic view's inspector.) When the panel is instantiated, it acts as a palette—it intercepts mouse clicks, and if the user has clicked on a subview, it puts the view in a scrap item wrapper and begins a drag-and-drop interaction on it as illustrated in FIG. 18.

Figure 18:
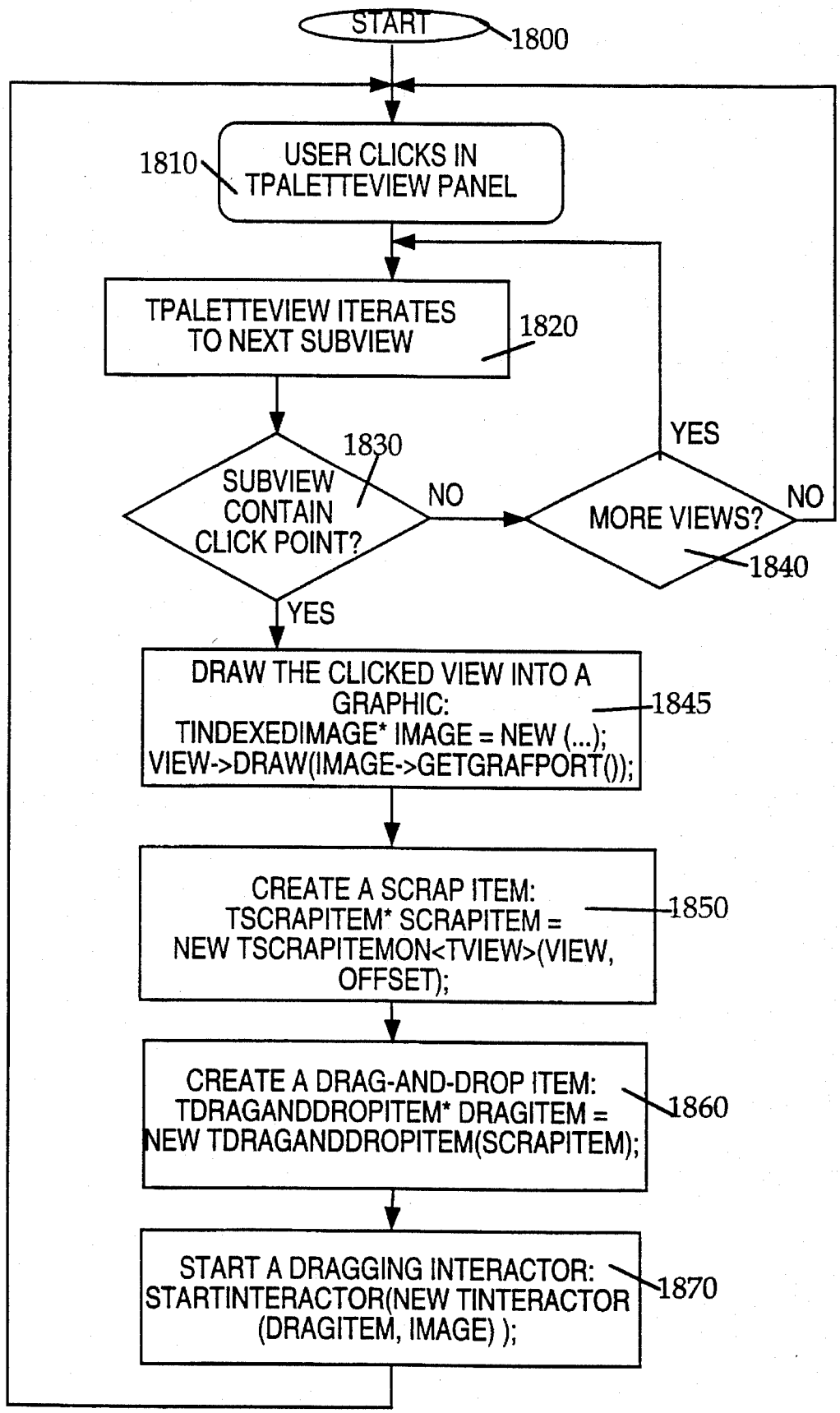
FIG. 18 is a flowchart detailing additional logic of parts palette processing in accordance with a preferred embodiment.

FIG. 18 illustrates the detailed logic utilized by a customizable parts palette in accordance with a preferred embodiment. Processing commences at terminal 1800 and immediately proceeds to input block 1810 where the system detects a user selection in a paletteview panel. When a user selects a panel, then in function block 1820, the next subview is invoked utilizing the selected panel as an input. A test is performed next in decision block 1830 to determine if the selected subview contains a click point. If no click point is detected, then control passes to decision block 1840 to determine if any more views exist. If no more views exist, then control passes to input block 1810 to await the next user selection. However, if more views are identified at decision block 1840, then control passes to function block 1820 to iterate to the next subview. If a subview contained a click box at decision block 1830, then the clicked view is drawn as shown in function block 1845, a scrap item is created as shown in function block 1850, a drag-and-drop item is created at function block 1860, a dragging interactor is started at function block 1870 and control is passed to function block 1810 to await the next selected panel.

A user can create any number of palette views containing custom controls or even complete view hierarchies, such as dialogs, for reuse. Each panel is assigned a name (a token), which is the archive key for retrieving the panel. Panels are then written to the palette archive.

Another view is a TSelectorView, whose purpose is to respond to boolean actions by showing and hiding panels. The user populates the selector view with boolean controls, such as radio buttons, each corresponding to a different parts panel. A user can create and layout the selector buttons using Constructor. Each button has a user-readable name, such as "Controls," and an action message whose name is the same as the name of the panel to be retrieved, such as "Controls Panel." The selector also maintains a dictionary cache that maps names (tokens) to view handles. Initially, this dictionary is empty. When a panel is loaded from the archive, a dictionary entry is added, associating the panel's name with its view handle.

When a selector receives a boolean event, it looks at the message token, then does two things. (1) It searches its internal dictionary for the token. If an entry is found, the associated panel is displayed. Otherwise, (2) the selector looks up the panel in its archive, using the message token as the key. If the panel is found, it is displayed and added to the dictionary. Using Constructor, a user extends the palettes by: (1) creating a new panel (control palette view) and adding subviews representing custom controls and views; (2) giving the panel a unique name; (3) adding to the archive's selector view a boolean control whose action message is the name of the panel; and (4) saving the archive. The new panel and controls are available as soon as the palette accesses its archive.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A localized user interface object archive system for use in a computer system having a storage means for translating a first application program which includes language specific to a first locale to a second application program includes language specific to a second locale under control of a program developer, the archive system comprising:

means controlled by the developer for creating a hierarchical locale tree in the storage means, the locale tree having a root locale and at least one other locale level representing the second locale;

means controlled by the developer for creating, in the root locale, a first plurality of user interface objects, each of which includes language specific to the first locale;

means controlled by the developer for creating, in the root locale, a second plurality of user interface objects, each of which does not include language specific to the first locale;

means controlled by the developer for storing the second plurality of user interface objects in the other locale level; and means controlled by the second application program for traversing the locale tree starting at the other locale level and proceeding to the root locale, the traversing means assembling a set of user interface objects from the user interface objects in the other locale level and user interface objects in the root locale that are not located in the other locale level.

2. A localized user interface object archive system according to claim 1 wherein the storage means comprises a shared library and the locale tree creation means comprises means for creating a hierarchical locale tree associated with the shared library.

3. A localized user interface object archive system according to claim 1 further including means controlled by the developer for creating an archive viewer object from a predefined object class template and the shared library, the archive viewer object displaying the hierarchical locale tree stored in the shared library.

4. A localized user interface object archive system according to claim 1 wherein the traversing means operates during runtime of the second application program.

5. A localized user interface object archive system according to claim 1 wherein the traversing means comprises means for retrieving copies of user interface objects from the user interface objects stored in the other locale level and copies of user interface objects in the root locale that are not located in the other locale level.

6. A user interface object archive system for use in a computer system having a display and storage means for translating a first application program which generates screen displays on the display which include language specific to a first locale to a second application program which generates screen displays on the display which include language specific to a second locale, the archive system comprising:

means for creating a first plurality of user interface objects, each of which generates a screen display including language specific to the first locale on the display screen;

means for creating a second plurality of user interface objects, each of which generates a screen display which does not include language specific to the first locale on the display screen;

means for creating a hierarchical locale tree in the storage means, the locale tree having a root locale and at least one other locale level representing the second locale;

means for storing the first plurality of user interface objects in the root locale;

means for storing the second plurality of user interface objects in the root locale and in the other locale level; and means for traversing the locale tree starting at the other locale level and proceeding to the root locale, the traversing means assembling a set of user interface objects from the user interface objects in the other locale level and user interface objects in the root locale that are not located in the other locale level.

7. A user interface object archive system according to claim 6 wherein the storage means comprises a shared library and the locale tree creation means comprises means for creating a hierarchical locale tree associated with the shared library.

8. A user interface object archive system according to claim 6 further including means for creating an archive viewer object from a predefined object class template and the shared library, the archive viewer object displaying the hierarchical locale tree stored in the shared library.

9. A user interface object archive system according to claim 8 wherein the archive viewer object comprises means for displaying the hierarchical locale tree in a first format and means for displaying the hierarchical locale tree in a second format.

10. A user interface object archive system according to claim 6 wherein the traversing means operates during runtime of the second application program.

11. A user interface object archive system according to claim 6 wherein the traversing means comprises means for retrieving copies of user interface objects from the user interface objects stored in the other locale level and copies of user interface objects in the root locale that are not located in the other locale level.

12. A method for use in a computer system having a storage means for translating a first application program which includes language specific to a first locale to a second application program includes language specific to a second locale under control of a program developer, the method comprising the steps of:

A. creating a hierarchical locale tree in the storage means, the locale tree having a root locale and at least one other locale level representing the second locale;

B. creating, in the root locale, a first plurality of user interface objects, each of which includes language specific to the first locale;

C. creating, in the root locale, a second plurality of user interface objects, each of which does not include language specific to the first locale;

D. storing the second plurality of user interface objects in the other locale level; and E. traversing the locale tree starting at the other locale level and proceeding to the root locale in order to assemble a set of user interface objects from the user interface objects in the other locale level and user interface objects in the root locale that are not located in the other locale level.

13. A method according to claim 12 wherein the storage means comprises a shared library and step A comprises the step of:

A1. creating a hierarchical locale tree associated with the shared library.

14. A method according to claim 12 further comprising the step of:

F. creating an archive viewer object from a predefined object class template and the shared library, the archive viewer object displaying the hierarchical locale tree stored in the shared library.

15. A method according to claim 12 wherein step D comprises the step of:

D1. operating the traversing means during runtime of the second application program.

16. A method according to claim 12 wherein step D comprises the steps of:

D2. retrieving copies of user interface objects from the user interface objects stored in the other locale level; and D3. retrieving copies of user interface objects in the root locale that are not located in the other locale level.

17. A method for use in a computer system having a display and storage means for translating a first application program which generates screen displays on the display which include language specific to a first locale to a second application program which generates screen displays on the display which include language specific to a second locale, the method comprising the steps of:

A. creating a first plurality of user interface objects, each of which generates a screen display including language specific to the first locale on the display screen;

B. creating a second plurality of user interface objects, each of which generates a screen display which does not include language specific to the first locale on the display screen;

C. creating a hierarchical locale tree in the storage means, the locale tree having a root locale and at least one other locale level representing the second locale;

D. storing the first plurality of user interface objects in the root locale;

E. storing the second plurality of user interface objects in the root locale and in the other locale level; and F. traversing the locale tree starting at the other locale level and proceeding to the root locale, the traversing means assembling a set of user interface objects from the user interface objects in the other locale level and user interface objects in the root locale that are not located in the other locale level.

18. A method according to claim 17 wherein the storage means comprises a shared library and wherein step C comprises the step of:

C1. creating a hierarchical locale tree associated with the shared library.

19. A method according to claim 17 further comprising the step of:

G. creating an archive viewer object from a predefined object class template and the shared library, the archive viewer object displaying the hierarchical locale tree stored associated with the shared library.

20. A method according to claim 19 wherein step G comprises the steps of:

G1. displaying the hierarchical locale tree in a first format; and

G2. displaying the hierarchical locale tree in a second format.

21. A method according to claim 17 wherein step F comprises the step of:

F1. operating the traversing means during runtime of the second application program.

22. A method according to claim 17 wherein step F comprises the steps of:

F2. retrieving copies of user interface objects from the user interface objects stored in the other locale level; and F3. retrieving copies of user interface objects in the root locale that are not located in the other locale level.

* * * * *